US012750524B2

(12) United States Patent
Koo et al.

(10) Patent No.: US 12,750,524 B2
(45) **Date of Patent: *Sep. 29, 2026**

(54) TRANSFORM-BASED IMAGE DECODING/ENCODING APPARATUS AND APPARATUS FOR TRANSMITTING THEREFOR

(71) Applicant: LG ELECTRONICS INC., Seoul (KR)

(72) Inventors: Moonmo Koo, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/906,831

(22) Filed: Oct. 4, 2024

(65) Prior Publication Data

US 2025/0030892 A1 Jan. 23, 2025

Related U.S. Application Data

(63) Continuation of application No. 17/914,602, filed as application No. PCT/KR2021/003577 on Mar. 23, 2021, now Pat. No. 12,160,612.

(60) Provisional application No. 63/003,874, filed on Apr. 1, 2020, provisional application No. 63/000,457, filed on Mar. 26, 2020.

(51) Int. Cl.

| | |
|---|---|
| ***H04N 19/60*** | (2014.01) |
| ***H04N 19/122*** | (2014.01) |
| ***H04N 19/124*** | (2014.01) |
| ***H04N 19/176*** | (2014.01) |
| ***H04N 19/18*** | (2014.01) |
| ***H04N 19/186*** | (2014.01) |
| ***H04N 19/70*** | (2014.01) |
| ***H04N 19/96*** | (2014.01) |

(52) U.S. Cl.

CPC ........... *H04N 19/60* (2014.11); *H04N 19/122* (2014.11); *H04N 19/124* (2014.11); *H04N 19/176* (2014.11); *H04N 19/18* (2014.11); *H04N 19/186* (2014.11); *H04N 19/70* (2014.11); *H04N 19/96* (2014.11)

(58) Field of Classification Search

CPC ........................................................ H04N 19/60
USPC ........................................ 375/240.01–240.29
See application file for complete search history.

(56) References Cited

U.S. PATENT DOCUMENTS

2020/0396455 A1* 12/2020 Liu ...................... H04N 19/196

* cited by examiner

*Primary Examiner* — Leron Beck

(74) *Attorney, Agent, or Firm* — Bryan Cave Leighton Paisner LLP

(57) ABSTRACT

An image decoding method according to the present document may comprise: a step of deriving transform coefficients for a current block by performing inverse quantization on the basis of residual information; and a step of deriving modified transform coefficients by applying LFNST to the transform coefficients, wherein the step of deriving the transform coefficients comprises a step of parsing position information of a last non-zero transform coefficient, an LFNST index related to application of the LFNST is parsed after parsing a position of the last non-zero transform coefficient, and the transform coefficients are derived after parsing the LFNST index.

13 Claims, 16 Drawing Sheets

FIG.8

| | | | | | | | |
|---|---|---|---|---|---|---|---|
| 1 | 2 | 3 | 4 | 5 | 6 | 7 | 8 |
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | | | | |
| 37 | 38 | 39 | 40 | | | | |
| 41 | 42 | 43 | 44 | | | | |
| 45 | 46 | 47 | 48 | | | | |

| | | | |
|---|---|---|---|
| 1 | 2 | 3 | 4 |
| 5 | 6 | 7 | 8 |
| 9 | 10 | 11 | 12 |
| 13 | 14 | 15 | 16 |

(a)

| | | | | | | | |
|---|---|---|---|---|---|---|---|
| 1 | 9 | 17 | 25 | 33 | 37 | 41 | 45 |
| 2 | 10 | 18 | 26 | 34 | 38 | 42 | 46 |
| 3 | 11 | 19 | 27 | 35 | 39 | 43 | 47 |
| 4 | 12 | 20 | 28 | 36 | 40 | 44 | 48 |
| 5 | 13 | 21 | 29 | | | | |
| 6 | 14 | 22 | 30 | | | | |
| 7 | 15 | 23 | 31 | | | | |
| 8 | 16 | 24 | 32 | | | | |

| | | | |
|---|---|---|---|
| 1 | 5 | 9 | 13 |
| 2 | 6 | 10 | 14 |
| 3 | 7 | 11 | 15 |
| 4 | 8 | 12 | 16 |

(b)

(a) (b)

(a) 4x4

(b) 8x4 / 4x8

(c) 4xN / Nx4, when N≥16

(d) 8x8

(e) MxN(M≥8, N≥8, M>8 or N>8)

(a) 4x4

(b) 8x4 / 4x8

(c) 4xN / Nx4, when N≥16

(d) 4xN / Nx4, when N≥16

(a) 8x8

(b) MxN(M≥8, N≥8, M>8 or N>8)

TRANSFORM-BASED IMAGE DECODING/ENCODING APPARATUS AND APPARATUS FOR TRANSMITTING THEREFOR

CROSS-REFERENCE TO RELATED APPLICATIONS

This application is a Continuation Application of U.S. patent application Ser. No. 17/914,602, filed on Sep. 26, 2022, now allowed, which is a National Stage of International Application No. PCT/KR2021/003577, filed on Mar. 23, 2021, which claims the benefit of U.S. Provisional Application No. 63,000,457, filed on Mar. 26, 2020, and U.S. Provisional Application No. 63,003,874, filed on Apr. 1, 2020 the contents of which are all hereby incorporated by reference herein in their entirety.

TECHNICAL FIELD

The present disclosure relates generally to an image coding technology and, more particularly, to an image coding method based on a transform in an image coding system and an apparatus therefor.

BACKGROUND ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

DISCLOSURE

Technical Problem

A technical problem of the present disclosure is to provide a method and an apparatus for increasing image coding efficiency.

Another technical problem of the present disclosure is to provide a method and an apparatus for increasing efficiency in coding an LFNST index.

Another technical problem of the present document is to provide a method and apparatus for increasing a coding efficiency of an LFNST index when a current block is of a single type.

Technical Solution

According to an embodiment of the present disclosure, there is provided an image decoding method performed by a decoding apparatus. The method may include deriving transform coefficients for a current block by performing inverse quantization based on the residual information; and deriving modified transform coefficients by applying LFNST to the transform coefficients, wherein deriving the transform coefficient may comprise parsing information on a position of a last non-zero transform coefficient, wherein an LFNST index related to application of the LFNST may be parsed after parsing the position of the last non-zero transform coefficient, and wherein the transform coefficients may be derived after parsing the LFNST index.

The position information of the last non-zero tranform coefficient and the LFNST index may be parsed in a residual coding level for syntax elements configuring a residual coding syntax table, and the syntax elements configuring the residual coding syntax table may be signaled for each transform block included in the current block.

When a tree type of the current block is a dual tree luma or a single tree and ISP is applied to the current block, the syntax elements configuring the residual coding syntax table may be signaled for each partition block for a luma component included in the current block.

The current block may be a coding unit, and an LFNST index parsing variable indicating whether the LFNST index is parsed in a coding unit level for syntax elements configuring a coding unit syntax table signaled before the residual coding level may be initialized, and the LFNST index parsing variable may be updated in the residual coding level for a first transform block that satisfies a parsing condition of the LFNST index among transform blocks included in the current block, and the updated LFNST index parsing variable may not be changed in the residual coding level for other transform block thereafter.

When the LFNST index parsing variable is updated, a size of the other transform block may be reset to a predetermined size reflecting zero-out.

When the size of the other transform block is 4×4 or 8×8, a maximum of 8 transform coefficients according to a scan order may be allowed to exist in a top-left 4×4 region.

After parsing the LFNST index, an MTS index for an inverse primary transform of the transform block may be parsed, and the MTS index may be signaled in the residual coding level or the coding unit level in which the LFNST index is signaled.

According to an embodiment of the present disclosure, there is provided an image encoding method performed by an encoding apparatus. The method may include encoding and outputting image information including residual information on the modified transform coefficients and an LFNST index related to application of the LFNST, wherein the residual information may include information on a position of a last non-zero transform coefficient, wherein the LFNST index may be encoded to be signaled after signaling the position of the last non-zero transform coefficient, and wherein the image information may be configured so that the modified transform coefficients are derived after parsing the LFNST index.

According to another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

Technical Effects

According to the present disclosure, it is possible to increase overall image/video compression efficiency.

According to the present disclosure, it is possible to increase efficiency in coding an LFNST index.

According to the present disclosure, when a current block is a single type, it is possible to increase a coding efficiency of an LFNST index.

The effects that can be obtained through specific examples of the present disclosure are not limited to the effects listed above. For example, there may be various technical effects that a person having ordinary skill in the related art can understand or derive from the present disclosure. Accordingly, specific effects of the present disclosure are not limited to those explicitly described in the present disclosure and may include various effects that can be understood or derived from the technical features of the present disclosure.

DESCRIPTION OF DIAGRAMS

FIG. 1 schematically illustrates an example of a video/image coding system to which the present disclosure is applicable.

Figure 5:
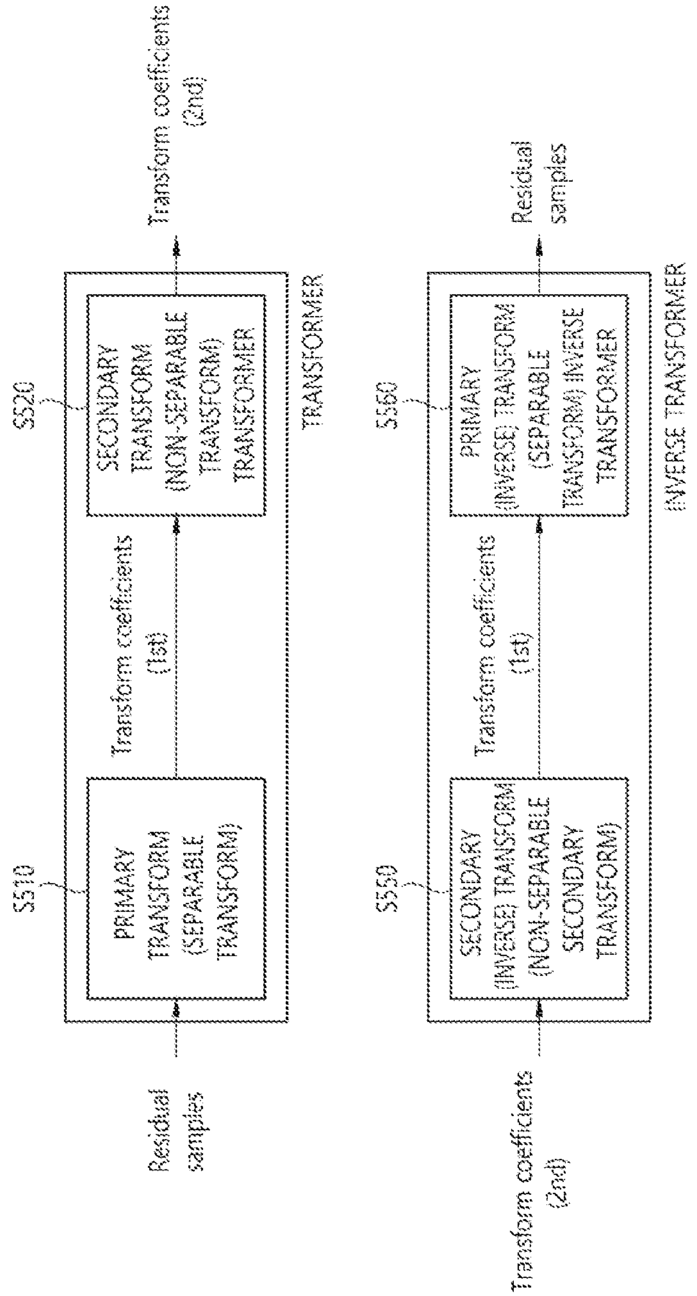

FIG. 5 schematically illustrates a multiple transform technique according to an embodiment of the present disclosure.

Figure 6:
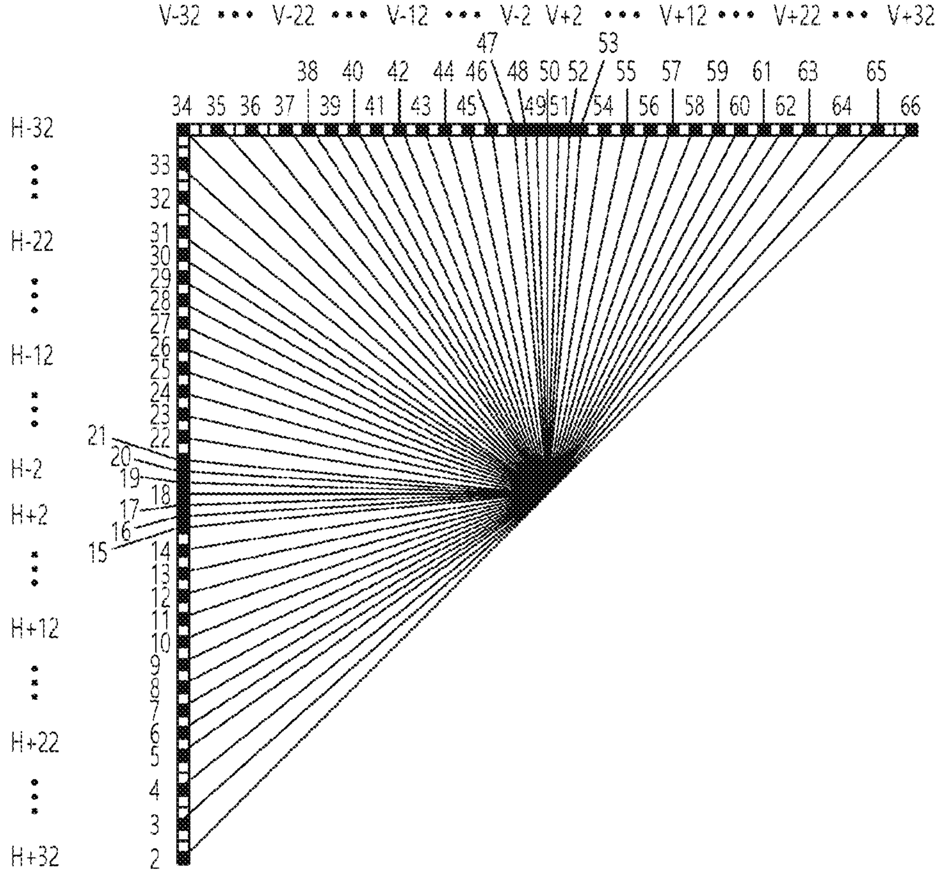

FIG. 6 exemplarily shows intra directional modes of 65 prediction directions.

Figure 7:
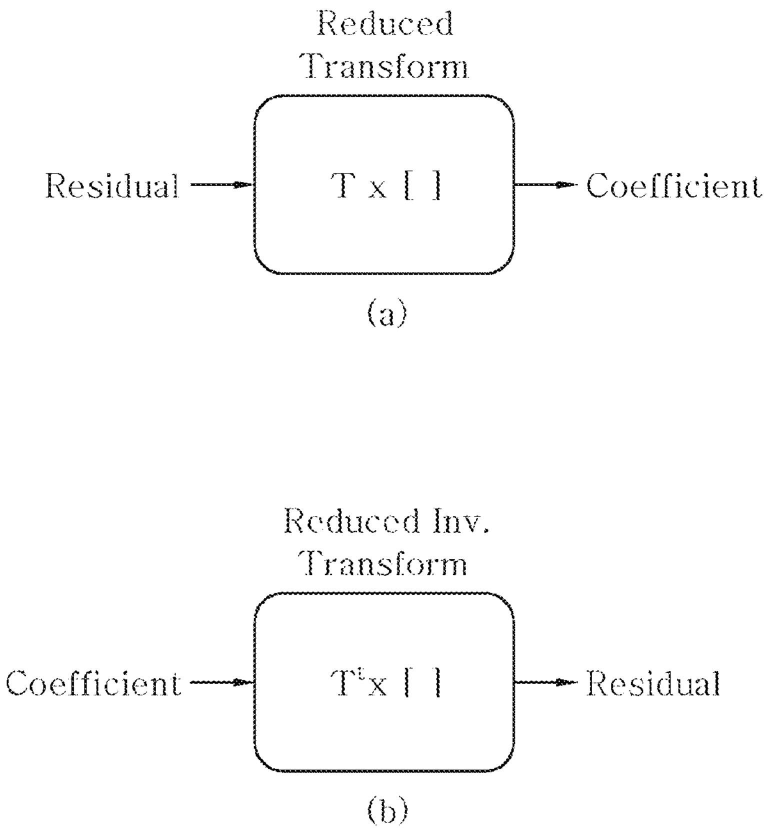

FIG. 7 is a diagram for explaining RST according to an embodiment of the present.

FIG. 8 is a diagram illustrating a sequence of arranging output data of a forward primary transformation into a one-dimensional vector according to an example.

Figure 9:
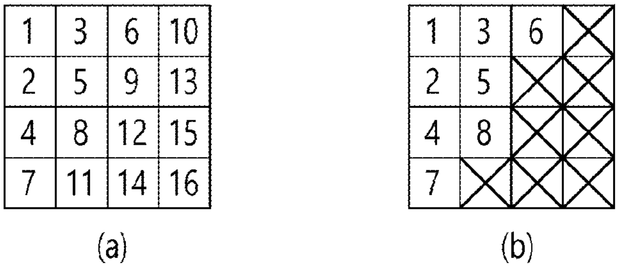

FIG. 9 is a diagram illustrating a sequence of arranging output data of a forward secondary transform into a two-dimensional block according to an example.

Figure 10:
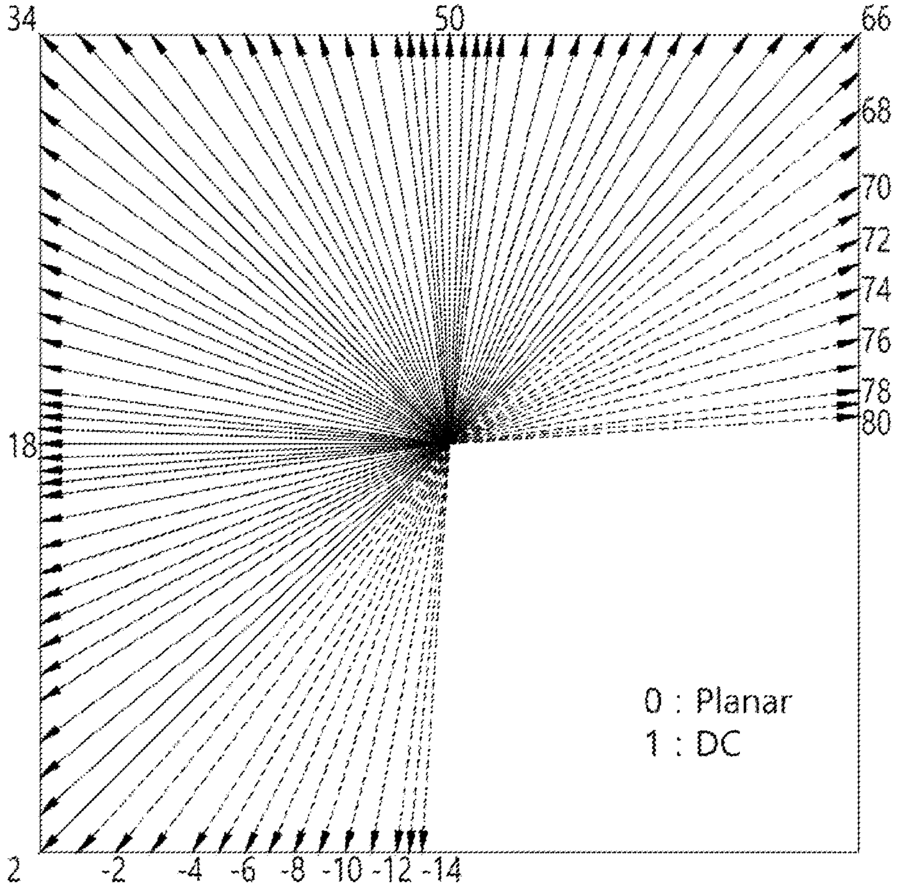

FIG. 10 is a diagram illustrating wide-angle intra prediction modes according to an embodiment of the present document.

Figure 11:
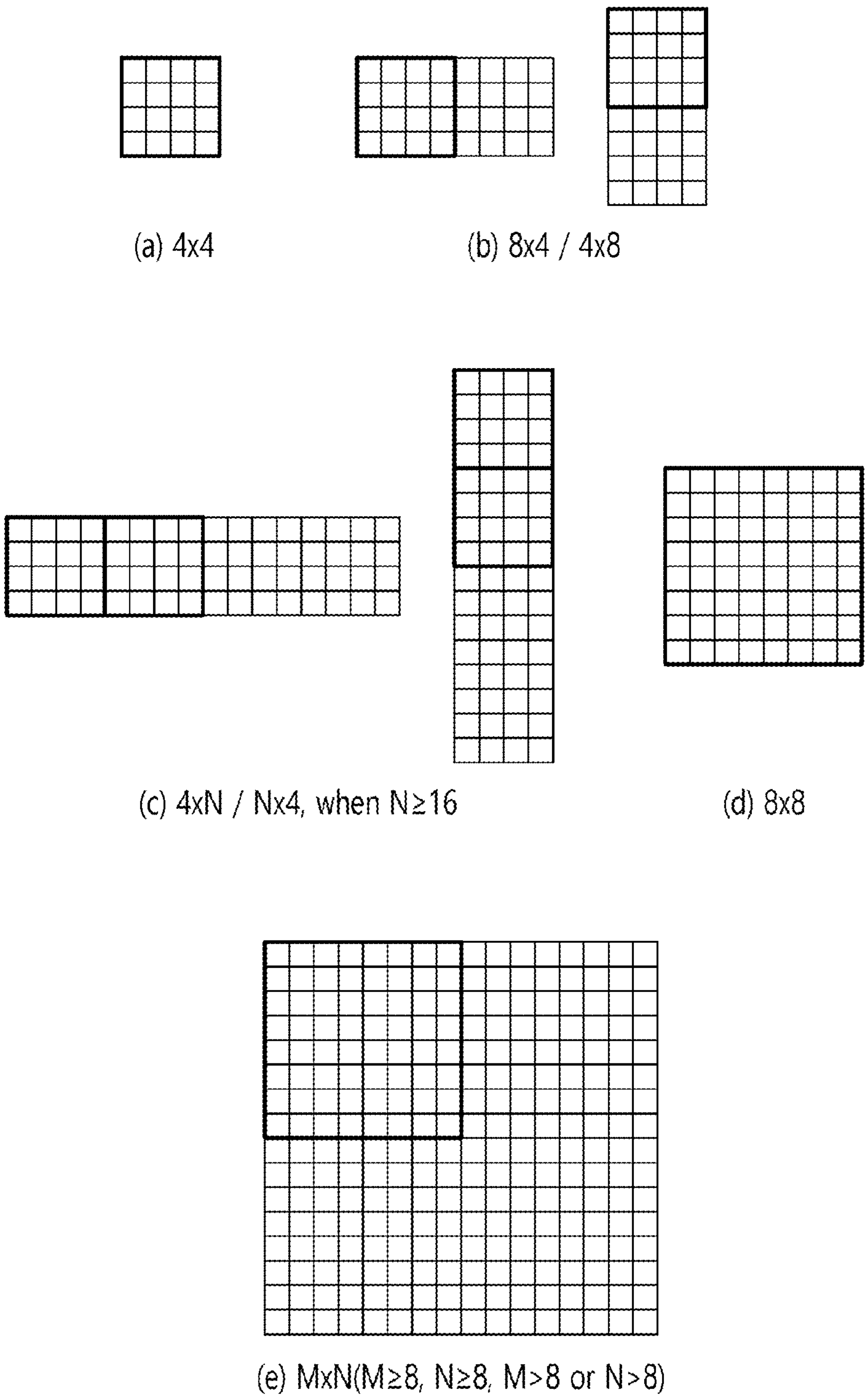

FIG. 11 is a diagram illustrating a block shape to which the LFNST is applied.

Figure 12:
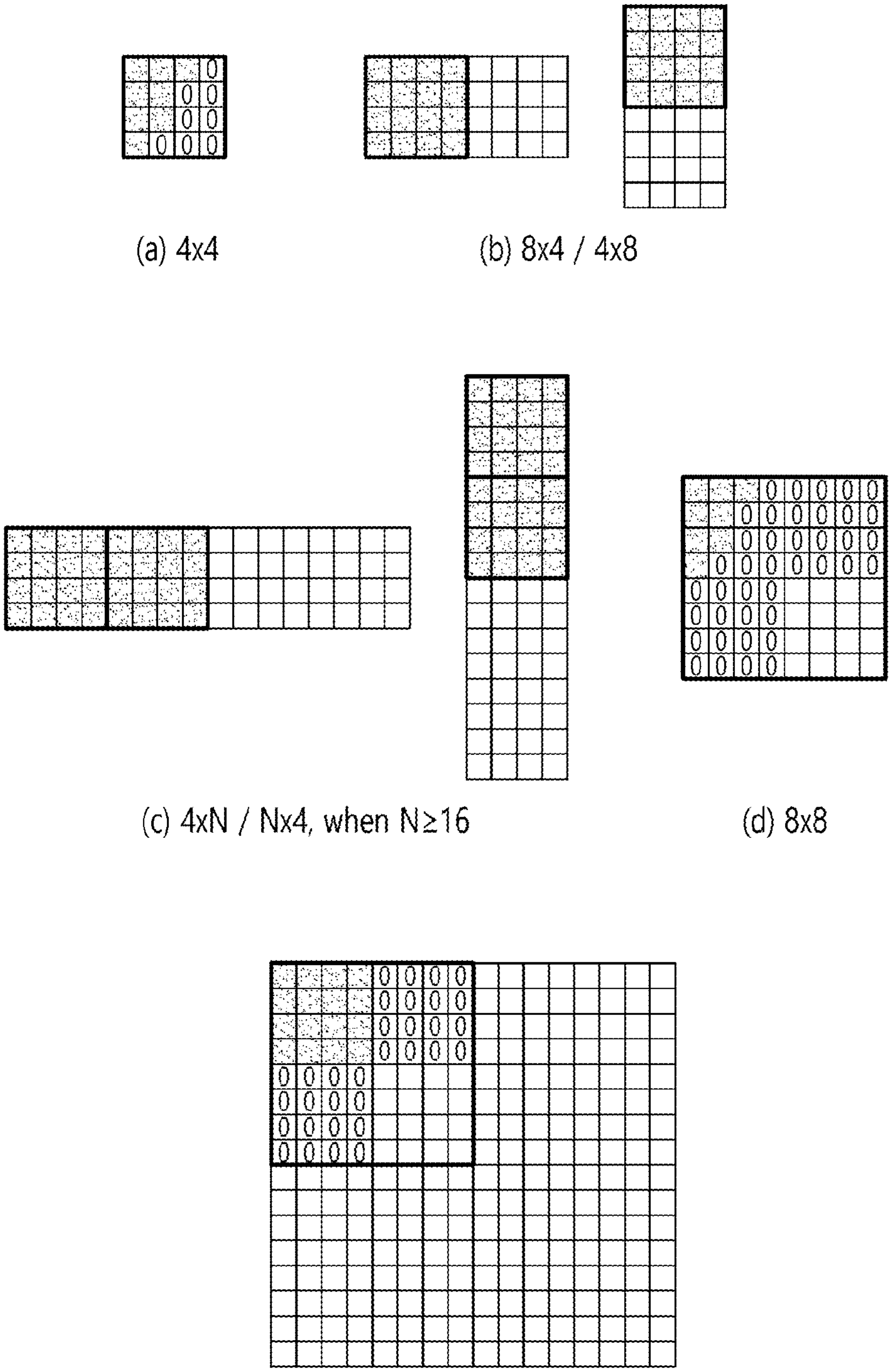

FIG. 12 is a diagram illustrating an arrangement of output data of a forward LFNST according to an example.

Figure 13:
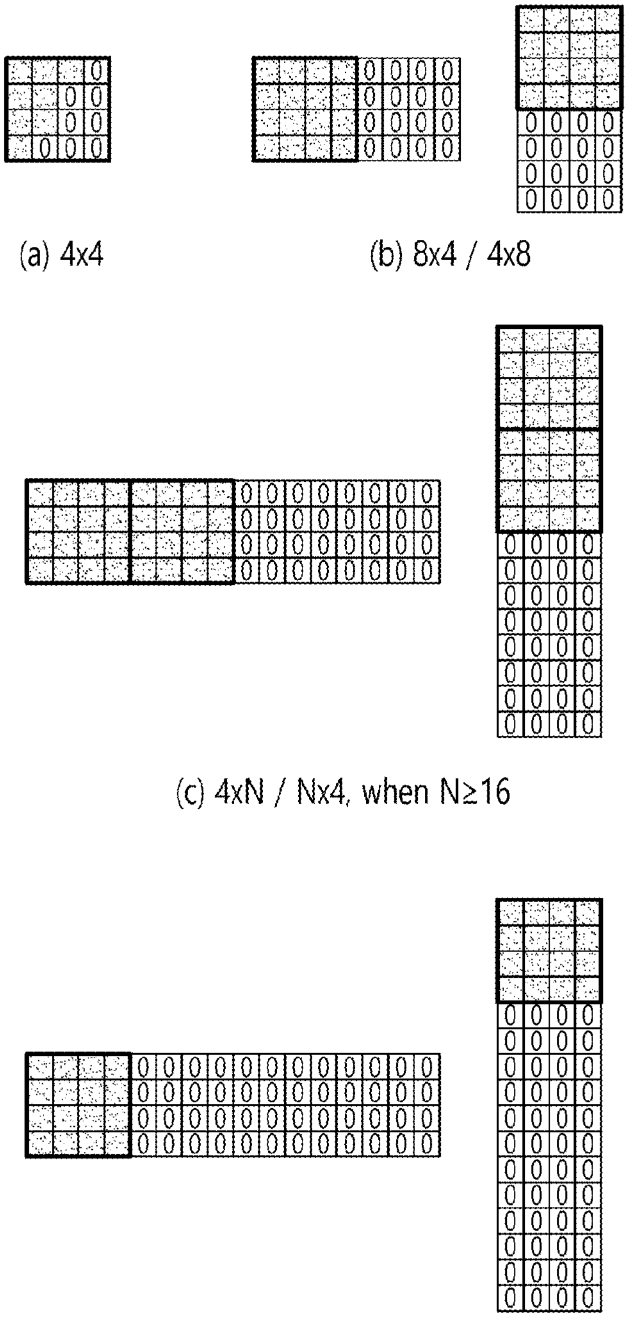

FIG. 13 illustrates zeroing-out in a block to which a 4×4 LFNST is applied according to an example.

Figure 14:
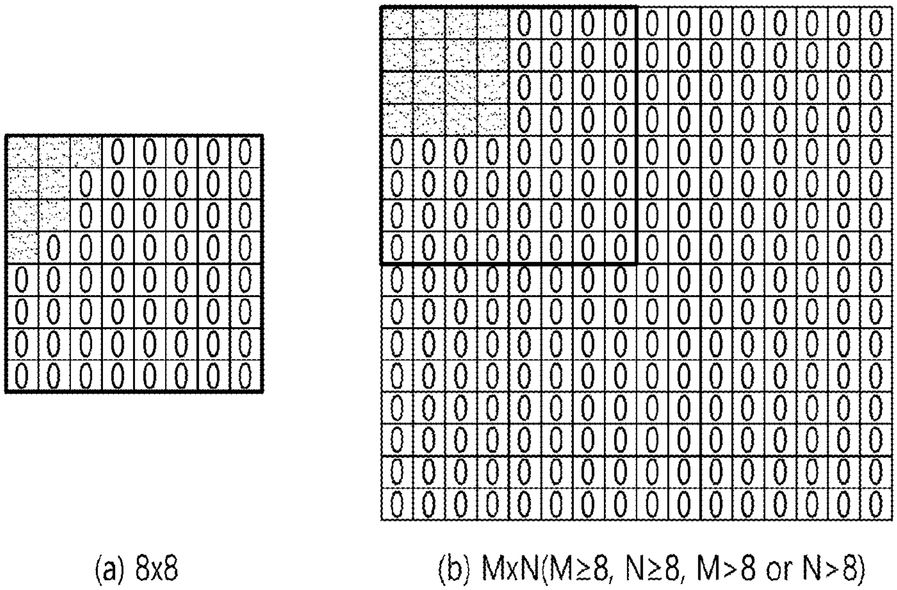

FIG. 14 illustrates zeroing-out in a block to which an 8×8 LFNST is applied according to an example.

Figure 15:
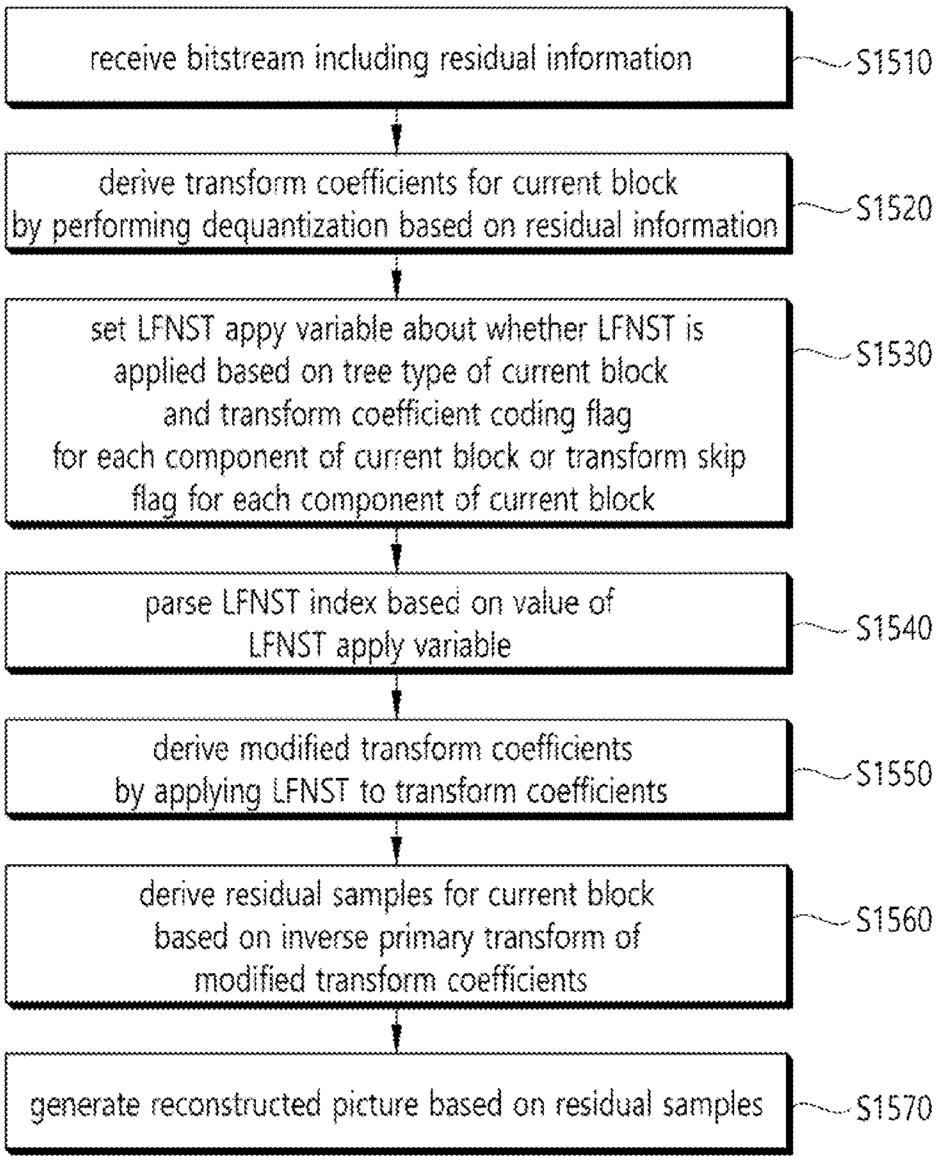

FIG. 15 is a flowchart illustrating an operation of a video decoding apparatus according to an embodiment of the present disclosure.

Figure 16:
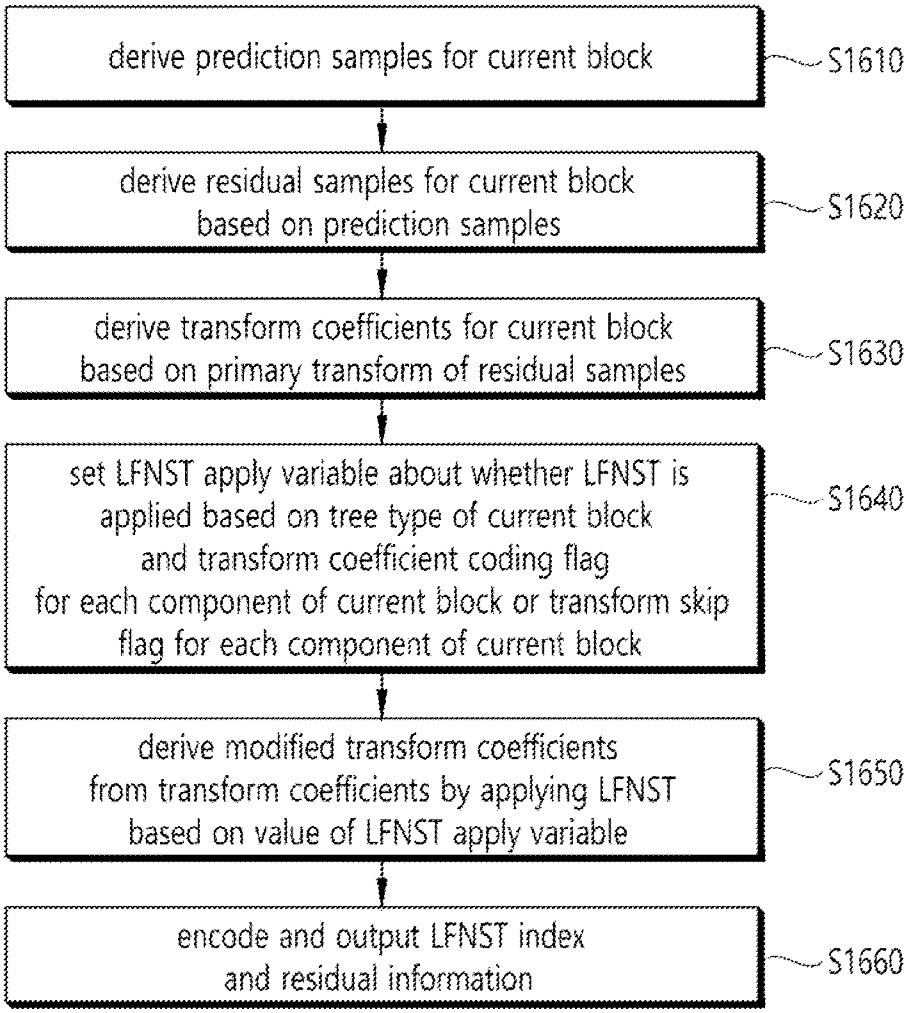

FIG. 16 is a flowchart illustrating an operation of a video encoding apparatus according to an embodiment of the present disclosure.

MODE FOR INVENTION

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". That is, "prediction" in the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

Figure 1:
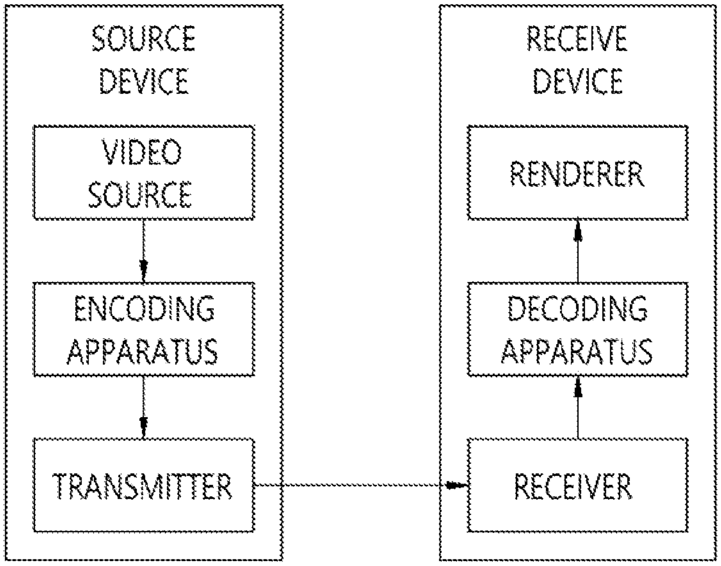

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
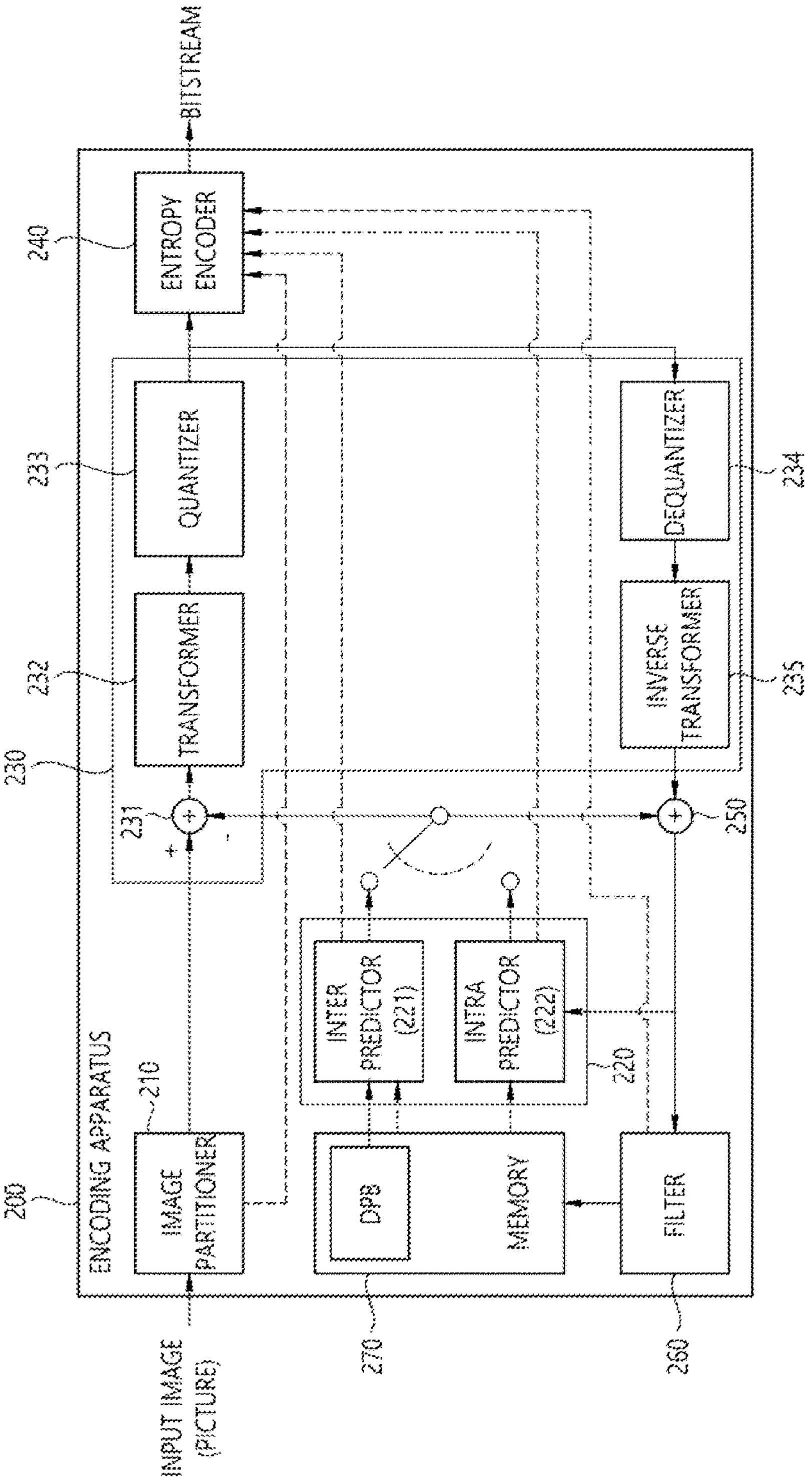
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal.

The transformer 232 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
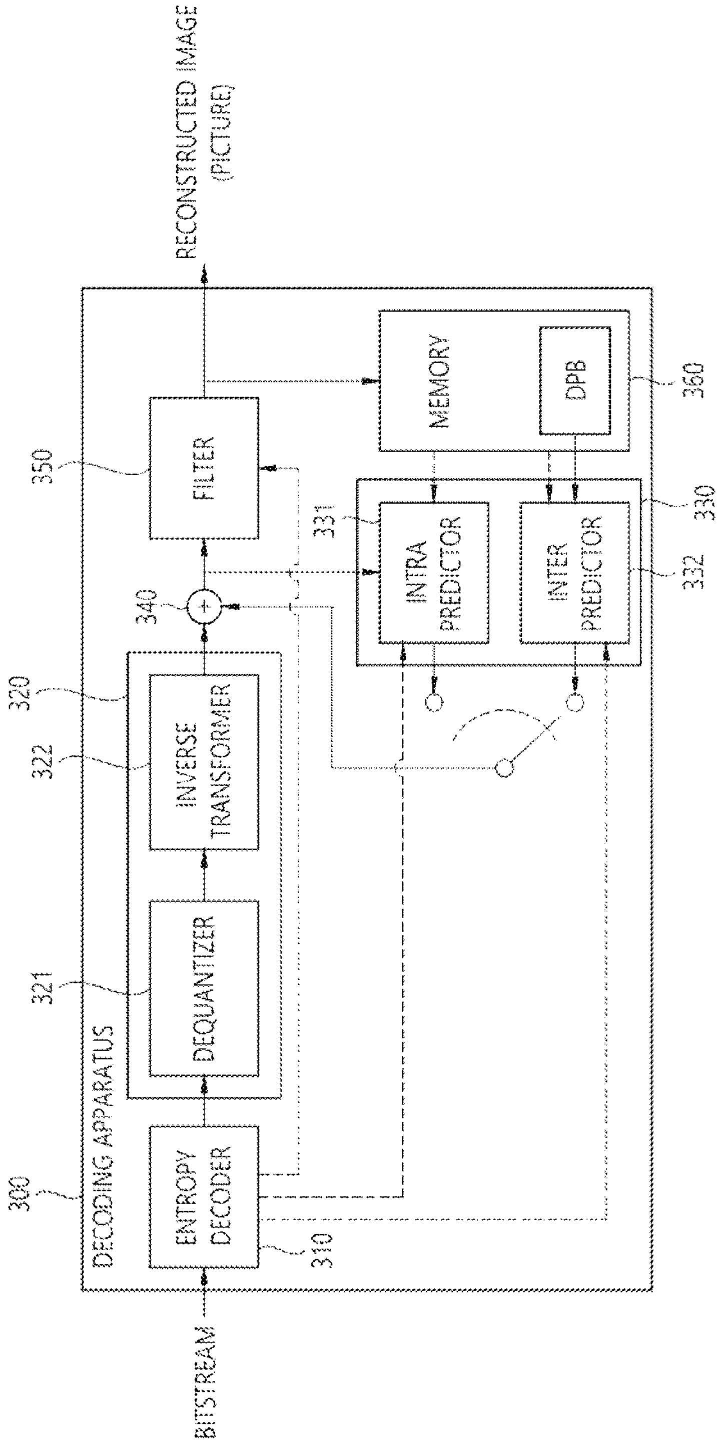
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array)

output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
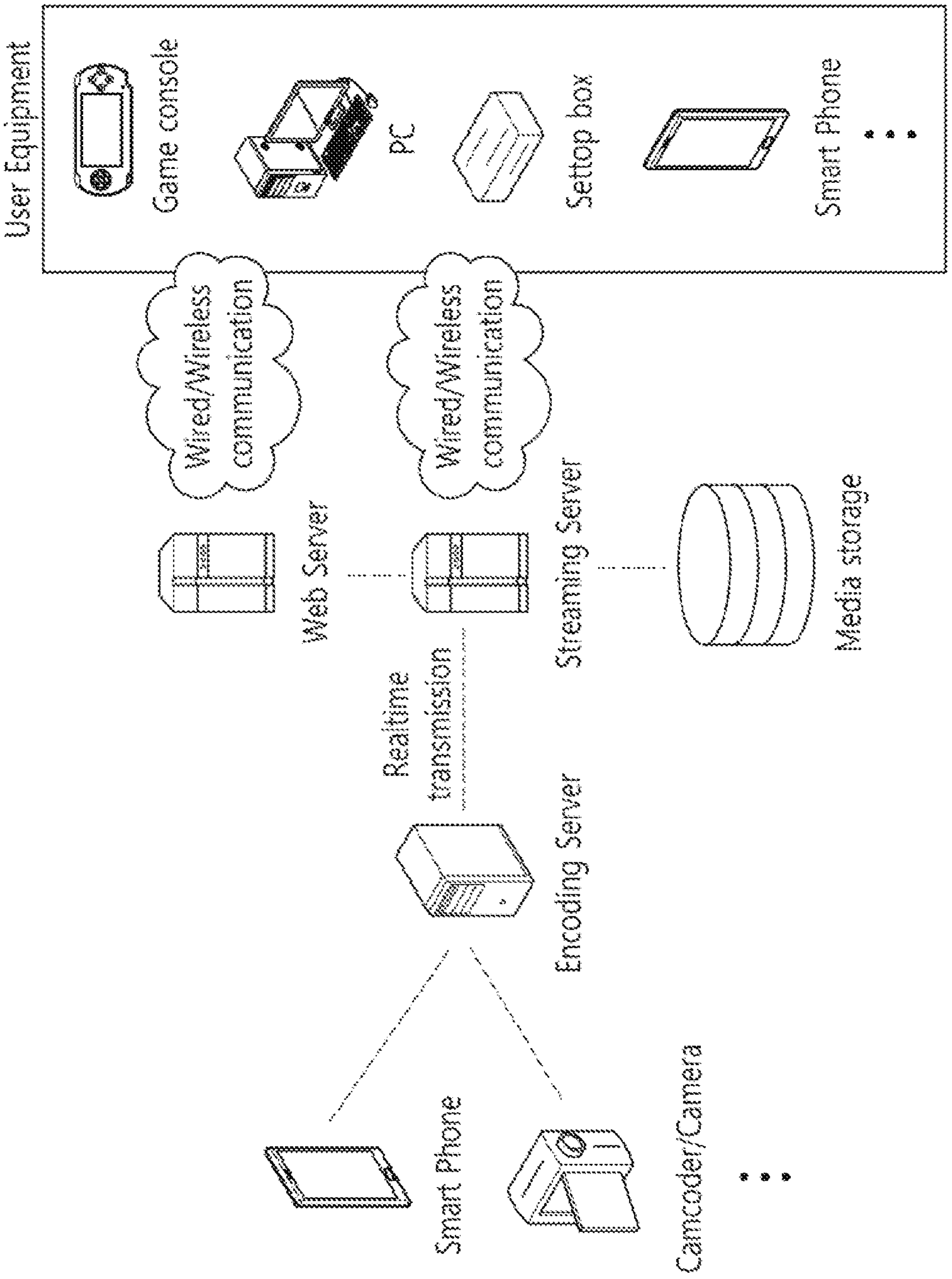
FIG. 4 illustrates the structure of a content streaming system to which the present disclosure is applied.

FIG. 4 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

FIG. 5 schematically illustrates a multiple transform technique according to an embodiment of the present disclosure.

Referring to FIG. 5, a transformer may correspond to the transformer in the foregoing encoding apparatus of FIG. 2, and an inverse transformer may correspond to the inverse transformer in the foregoing encoding apparatus of FIG. 2, or to the inverse transformer in the decoding apparatus of FIG. 3.

The transformer may derive (primary) transform coefficients by performing a primary transform based on residual samples (residual sample array) in a residual block (S510). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

That is, when the conventional transform method is applied, transform coefficients may be generated by applying transform from a space domain to a frequency domain to a residual signal (or residual block) based on DCT type 2. However, when the multiple core transform is applied, transform coefficients (or primary transform coefficients) may be generated by applying transform from a space domain to a frequency domain to a residual signal (or residual block) based on DCT type 2, DST type 7, DCT type 8, and/or DST type 1. Here, DCT type 2, DST type 7, DCT type 8, and DST type 1 may be referred to as transform types, transform kernels, or transform cores. These DCT/DST types may be defined based on basis functions.

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trType Ver value of 0 may be set to DCT2, a trTypeHor or trType Ver value of 1 may be set to DST-7, and a trTypeHor or trType Ver value of 2 may be set to DCT-8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trType Ver values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both both trTypeHor and trType Ver values are 2.

In one example, transform kernel sets according to MTS index information are illustrated in the following table.

TABLE 1

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may derive modified (secondary) transform coefficients by performing the secondary transform based on the (primary) transform coefficients (S520). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which is not separately applied in the vertical direction and the horizontal direction for the (primary) transform coefficients, and for example, two-dimensional signals (transform coefficients) are re-arranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min (8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min (8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{[Equation 1]}$$

If the X is represented in the form of a vector, the vector 1>may be represented as below.

[Equation 2]

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$

In Equation 2, the vector x is a one-dimensional vector obtained by rearranging the two-dimensional block X of Equation 1 according to the row-first order.

In this case, the secondary non-separable transform may be calculated as below.

$$\vec{F} = T \cdot \vec{X} \quad \text{[Equation 3]}$$

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra prediction mode No. 67 may be further used, and the intra prediction mode No. 67 may represent a linear model (LM) mode.

FIG. 6 exemplarily shows intra directional modes of 65 prediction directions.

Referring to FIG. 6, on the basis of intra prediction mode 34 having a left upward diagonal prediction direction, the intra prediction modes may be divided into intra prediction modes having horizontal directionality and intra prediction modes having vertical directionality. In FIG. 6, H and V denote horizontal directionality and vertical directionality, respectively, and numerals −32 to 32 indicate displacements in 1/32 units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode.

According to an example, the four transform sets according to the intra prediction mode may be mapped, for example, as shown in the following table.

TABLE 2

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

As shown in Table 2, any one of the four transform sets, that is, IfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, Ifnst index value 0 may refer to a first non-separable secondary transform kernel, Ifnst index value 1 may refer to a second non-separable secondary transform kernel, and Ifnst index value 2 may refer to a third non-separable secondary transform kernel. Alternatively, Ifnst index value 0 may indicate that the first non-separable secondary transform is not applied to the target block, and Ifnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S550), and may obtain a residual block (residual samples) by performing a primary (inverse) transform on the (primary) transform coefficients (S560). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, ince the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform for the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 7 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be RxN less than N×N, the size of a conventional transform matrix, and may be defined as in Equation 4 below.

[Equation 4]

$$T_{R\times N} = \begin{bmatrix} t_{11} & t_{12} & t_{13} & \dots & t_{1N} \\ t_{21} & t_{22} & t_{23} & & t_{2N} \\ & \vdots & & \ddots & \vdots \\ t_{R1} & t_{R2} & t_{R3} & \dots & t_{RN} \end{bmatrix}$$

The matrix T in the Reduced Transform block shown in FIG. 7(*a*) may mean the matrix $T_{RxN}$ of Equation 4. As shown in FIG. 7(*a*), when the reduced transform matrix $T_{RxN}$ is multiplied to residual samples for the target block, transform coefficients for the target block may be derived.

In an example, if the size of the block to which the transform is applied is 8×8 and R=16 (i.e., R/N=16/64=¼), then the RST according to FIG. 7(*a*) may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

[Equation 5]

$$\begin{bmatrix} t_{1,1} & t_{1,2} & t_{1,3} & \dots & t_{1,64} \\ t_{2,1} & t_{2,2} & t_{2,3} & & t_{2,64} \\ & \vdots & & \ddots & \vdots \\ t_{16,1} & t_{16,2} & t_{16,3} & \dots & t_{16,64} \end{bmatrix} \times \begin{bmatrix} r_1 \\ r_2 \\ \vdots \\ \vdots \\ \vdots \\ r_{64} \end{bmatrix}$$

In Equation 5, $r_1$ to $r_{64}$ may represent residual samples for the target block and may be specifically transform coefficients generated by applying a primary transform. As a result of the calculation of Equation 5 transform coefficients $c_i$ for the target block may be derived, and a process of deriving $c_i$ may be as in Equation 6.

[Equation 6]

```
for i from 1 to R:
    c_i = 0
  for j from 1 to N:
    c_i += t_{i,j} * r_j
```

As a result of the calculation of Equation 6, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N\times R}$ according to an example is N×R less than the size N×N of the regular inverse transform matrix, and is in a transpose relationship with the reduced transform matrix TR×N shown in Equation 4.

The matrix T' in the Reduced Inv. Transform block shown in FIG. 7(*b*) may mean the inverse RST matrix $T_{R\times N}^T$ (the superscript T means transpose). When the inverse RST matrix TRENT is multiplied to the transform coefficients for the target block as shown in FIG. 7(*b*), the modified transform coefficients for the target block or the residual samples for the current block may be derived. The inverse RST matrix $T_{R\times N}^T$ may be expressed as $(T_{R\times N}^T)_{N\times R}$.

More specifically, when the inverse RST is applied as the secondary inverse transform, the modified transform coefficients for the target block may be derived when the inverse RST matrix $T_{R\times N}^T$ is multiplied to the transform coefficients for the target block. Meanwhile, the inverse RST may be applied as the inverse primary transform, and in this case, the residual samples for the target block may be derived when the inverse RST matrix $T_{R\times N}^T$ is multiplied to the transform coefficients for the target block.

In an example, if the size of the block to which the inverse transform is applied is 8×8 and R=16 (i.e., R/N=16/64=¼), then the RST according to FIG. 7(*b*) may be expressed as a matrix operation as shown in Equation 7 below.

[Equation 7]

$$\begin{bmatrix} t_{1,1} & t_{2,1} & & t_{16,1} \\ t_{1,2} & t_{2,2} & \cdots & t_{16,2} \\ t_{1,3} & t_{2,3} & & t_{16,3} \\ \vdots & & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}.$$

In Equation 7, $c_1$ to $c_{16}$ may represent the transform coefficients for the target block. As a result of the calculation of Equation 7, $r_i$ representing the modified transform coefficients for the target block or the residual samples for the target block may be derived, and the process of deriving $r_i$ may be as in Equation 8.

[Equation 8]

$$\boxed{\begin{array}{c} \text{for } i \text{ from } 1 \text{ to } N \\ r_1 = 0 \\ \text{for } j \text{ from } 1 \text{ to } R \\ r_i \mathrel{+}= t_{ji} * c_j \end{array}}.$$

As a result of the calculation of Equation 8, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an lfnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when both W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an nx1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 235 of the encoding apparatus 200 and the inverse transformer 322 of the decoding apparatus 300 may include an inverse reduced secondary transformer to derive modified transform coefficients based on an inverse RST on transform coefficients and an inverse primary transformer to derive residual samples for the target block based on an inverse primary transform on the modified transform coefficients. The inverse primary transform refers to the inverse transform of a primary transform applied to a residual. In the present disclosure, deriving a transform coefficient based on a transform may refer to deriving the transform coefficient by applying the transform.

The above-described non-separated transform, the LFNST, will be described in detail as follows. The LFNST may include a forward transform by the encoding apparatus and an inverse transform by the decoding apparatus.

The encoding apparatus receives a result (or a part of a result) derived after applying a primary (core) transform as an input, and applies a forward secondary transform (secondary transform).

$$y = G^T x \quad \text{[Equation 9]}$$

In Equation 9, x and y are inputs and outputs of the secondary transform, respectively, and G is a matrix representing the secondary transform, and transform basis vectors are composed of column vectors. In the case of an inverse LFNST, when the dimension of the transformation matrix G is expressed as [number of rows x number of columns], in the case of an forward LFNST, the transposition of matrix G becomes the dimension of GT.

For the inverse LFNST, the dimensions of matrix G are [48×16], [48×8], [16×16], [16×8], and the [48×8] matrix and the [16×8] matrix are partial matrices that sampled 8 transform basis vectors from the left of the [48×16] matrix and the [16×16] matrix, respectively.

On the other hand, for the forward LFNST, the dimensions of matrix GT are [16×48], [8×48], [16×16], [8×16], and the [8×48] matrix and the [8×16] matrix are partial matrices obtained by sampling 8 transform basis vectors from the top of the [16×48] matrix and the [16×16] matrix, respectively.

Therefore, in the case of the forward LFNST, a [48×1] vector or [16×1] vector is possible as an input x, and a [16×1] vector or a [8×1] vector is possible as an output y. In video coding and decoding, the output of the forward primary transform is two-dimensional (2D) data, so to construct the [48×1] vector or the [16×1] vector as the input x, a one-dimensional vector must be constructed by properly arranging the 2D data that is the output of the forward transformation.

FIG. 8 is a diagram illustrating a sequence of arranging output data of a forward primary transformation into a one-dimensional vector according to an example. The left diagrams of (a) and (b) of FIG. 8 show the sequence for constructing a [48×1] vector, and the right diagrams of (a) and (b) of FIG. 8 shows the sequence for constructing a [16×1] vector. In the case of the LFNST, a one-dimensional vector x can be obtained by sequentially arranging 2D data in the same order as in (a) and (b) of FIG. 8.

The arrangement direction of the output data of the forward primary transform may be determined according to an intra prediction mode of the current block. For example, when the intra prediction mode of the current block is in the horizontal direction with respect to the diagonal direction, the output data of the forward primary transform may be arranged in the order of (a) of FIG. 8, and when the intra prediction mode of the current block is in the vertical direction with respect to the diagonal direction, the output data of the forward primary transform may be arranged in the order of (b) of FIG. 8.

According to an example, an arrangement order different from the arrangement orders of (a) and (b) FIG. 8 may be applied, and in order to derive the same result (y vector) as when the arrangement orders of (a) and (b) FIG. 8 is applied, the column vectors of the matrix G may be rearranged according to the arrangement order. That is, it is possible to rearrange the column vectors of G so that each element constituting the x vector is always multiplied by the same transform basis vector.

Since the output y derived through Equation 9 is a one-dimensional vector, when two-dimensional data is required as input data in the process of using the result of the forward secondary transformation as an input, for example, in the process of performing quantization or residual coding, the output y vector of Equation 9 must be properly arranged as 2D data again.

FIG. 9 is a diagram illustrating a sequence of arranging output data of a forward secondary transform into a two-dimensional block according to an example.

In the case of the LFNST, output values may be arranged in a 2D block according to a predetermined scan order. (a) of FIG. 9 shows that when the output y is a [16×1] vector, the output values are arranged at 16 positions of the 2D block according to a diagonal scan order. (b) of FIG. 9 shows that when the output y is a [8×1] vector, the output values are arranged at 8 positions of the 2D block according to the diagonal scan order, and the remaining 8 positions are filled with zeros. X in (b) of FIG. 9 indicates that it is filled with zero.

According to another example, since the order in which the output vector y is processed in performing quantization or residual coding may be preset, the output vector y may not be arranged in the 2D block as shown in FIG. 9. However, in the case of the residual coding, data coding may be performed in 2D block (e.g., 4×4) units such as CG (Coefficient Group), and in this case, the data are arranged according to a specific order as in the diagonal scan order of FIG. 9.

Meanwhile, the decoding apparatus may configure the one-dimensional input vector y by arranging two-dimensional data output through a dequantization process or the like according to a preset scan order for the inverse transformation. The input vector y may be output as the output vector x by the following equation.

$$x = Gy \qquad \text{[Equation 10]}$$

In the case of the inverse LFNST, an output vector x can be derived by multiplying an input vector y, which is a [16×1] vector or a [8×1] vector, by a G matrix. For the inverse LFNST, the output vector x can be either a [48×1] vector or a [16×1] vector.

The output vector x is arranged in a two-dimensional block according to the order shown in FIG. 8 and is arranged as two-dimensional data, and this two-dimensional data becomes input data (or a part of input data) of the inverse primary transformation.

Accordingly, the inverse secondary transformation is the opposite of the forward secondary transformation process as a whole, and in the case of the inverse transformation, unlike in the forward direction, the inverse secondary transformation is first applied, and then the inverse primary transformation is applied.

In the inverse LFNST, one of 8 [48×16] matrices and 8 [16×16] matrices may be selected as the transformation matrix G. Whether to apply the [48×16] matrix or the [16×16] matrix depends on the size and shape of the block.

In addition, 8 matrices may be derived from four transform sets as shown in Table 2 above, and each transform set may consist of two matrices. Which transform set to use among the 4 transform sets is determined according to the intra prediction mode, and more specifically, the transform set is determined based on the value of the intra prediction mode extended by considering the Wide Angle Intra Prediction (WAIP). Which matrix to select from among the two matrices constituting the selected transform set is derived through index signaling. More specifically, 0, 1, and 2 are possible as the transmitted index value, 0 may indicate that the LFNST is not applied, and 1 and 2 may indicate any one of two transform matrices constituting a transform set selected based on the intra prediction mode value.

FIG. 10 is a diagram illustrating wide-angle intra prediction modes according to an embodiment of the present document.

The general intra prediction mode value may have values from 0 to 66 and 81 to 83, and the intra prediction mode value extended due to WAIP may have a value from −14 to 83 as shown. Values from 81 to 83 indicate the CCLM (Cross Component Linear Model) mode, and values from −14 to −1 and values from 67 to 80 indicate the intra prediction mode extended due to the WAIP application.

When the width of the prediction current block is greater than the height, the upper reference pixels are generally closer to positions inside the block to be predicted. Therefore, it may be more accurate to predict in the bottom-left direction than in the top-right direction. Conversely, when the height of the block is greater than the width, the left reference pixels are generally close to positions inside the block to be predicted. Therefore, it may be more accurate to predict in the top-right direction than in the bottom-left direction. Therefore, it may be advantageous to apply remapping, ie, mode index modification, to the index of the wide-angle intra prediction mode.

When the wide-angle intra prediction is applied, information on the existing intra prediction may be signaled, and after the information is parsed, the information may be remapped to the index of the wide-angle intra prediction mode. Therefore, the total number of the intra prediction modes for a specific block (eg, a non-square block of a specific size) may not change, and that is, the total number of the intra prediction modes is 67, and intra prediction mode coding for the specific block may not be changed.

Meanwhile, as described above, which transform matrix of the [48×16] matrix and the [16×16] matrix is applied to the LFNST is determined by the size and shape of the transform target block.

FIG. 11 is a diagram illustrating a block shape to which the LFNST is applied. (a) of FIG. 11 shows 4×4 blocks, (b) shows 4×8 and 8×4 blocks, (c) shows 4×N or N×4 blocks in which N is 16 or more, (d) shows 8×8 blocks, (e) shows M×N blocks where M>8, N≥8, and N>8 or M>8.

In FIG. 11, blocks with thick borders indicate regions to which the LFNST is applied. For the blocks of FIGS. 13(*a*) and (*b*), the LFNST is applied to the top-left 4×4 region, and for the block of FIG. 11(*c*), the LFNST is applied individually the two top-left 4×4 regions are continuously arranged. In (a), (b), and (c) of FIG. 11, since the LFNST is applied in units of 4×4 regions, this LFNST will be hereinafter referred to as "4×4 LFNST". Based on the matrix dimension for G, a [16×16] or [16×8] matrix may be applied.

More specifically, the [16×8] matrix is applied to the 4×4 block (4×4 TU or 4×4 CU) of FIG. 11(*a*) and the [16×16] matrix is applied to the blocks in (b) and (c) of FIG. 11. This is to adjust the computational complexity for the worst case to 8 multiplications per sample.

With respect to (d) and (e) of FIG. 11, the LFNST is applied to the top-left 8×8 region, and this LFNST is hereinafter referred to as "8×8 LFNST". As a corresponding transformation matrix, a [48×16] matrix or [48×8] matrix may be applied. In the case of the forward LFNST, since the [48×1] vector (x vector in Equation 9) is input as input data, all sample values of the top-left 8×8 region are not used as input values of the forward LFNST. That is, as can be seen in the left order of FIG. 8(*a*) or the left order of FIG. 8(*b*), the [48×1] vector may be constructed based on samples belonging to the remaining 3 4×4 blocks while leaving the bottom-right 4×4 block as it is.

The [48×8] matrix may be applied to an 8×8 block (8×8 TU or 8×8 CU) in FIG. 11 (*d*), and the [48×16] matrix may be applied to the 8×8 block in FIG. 11(*e*). This is also to adjust the computational complexity for the worst case to 8 multiplications per sample.

Depending on the block shape, when the corresponding forward LFNST (4×4 LFNST or 8×8 LFNST) is applied, 8 or 16 output data (y vector in Equation 9, [8×1] or [16×1] vector) is generated. In the forward LFNST, the number of output data is equal to or less than the number of input data due to the characteristics of the matrix GT.

FIG. 12 is a diagram illustrating an arrangement of output data of a forward LFNST according to an example, and shows a block in which output data of the forward LFNST is arranged according to a block shape.

The shaded area at the top-left of the block shown in FIG. 12 corresponds to the area where the output data of the forward LFNST is located, the positions marked with 0 indicate samples filled with 0 values, and the remaining area represents regions that are not changed by the forward LFNST. In the area not changed by the LFNST, the output data of the forward primary transform remains unchanged.

As described above, since the dimension of the transform matrix applied varies according to the shape of the block, the number of output data also varies. As FIG. 12, the output data of the forward LFNST may not completely fill the top-left 4×4 block. In the case of (a) and (d) of FIG. 12, a [16×8] matrix and a [48×8] matrix are applied to the block indicated by a thick line or a partial region inside the block, respectively, and a [8×1] vector as the output of the forward LFNST is generated. That is, according to the scan order shown in (b) of FIG. 9, only 8 output data may be filled as shown in (a) and (d) of FIGS. 12, and 0 may be filled in the remaining 8 positions. In the case of the LFNST applied block of FIG. 11(*d*), as shown in FIG. 12(*d*), two 4×4 blocks in the top-right and bottom-left adjacent to the top-left 4×4 block are also filled with 0 values.

As described above, basically, by signaling the LFNST index, whether to apply the LFNST and the transform matrix to be applied are specified. As shown FIG. 12, when the LENST is applied, since the number of output data of the forward LFNST may be equal to or less than the number of input data, a region filled with a zero value occurs as follows.

1) As shown in (a) of FIG. 12, samples from the 8th and later positions in the scan order in the top-left 4×4 block, that is, samples from the 9th to the 16th.

2) As shown in (d) and (e) of FIG. 12, when the [48×16] matrix or the [48×8] matrix is applied, two 4×4 blocks adjacent to the top-left 4×4 block or the second and third 4×4 blocks in the scan order.

Therefore, if non-zero data exists by checking the areas 1) and 2), it is certain that the LENST is not applied, so that the signaling of the corresponding LFNST index can be omitted.

According to an example, for example, in the case of LFNST adopted in the VVC standard, since signaling of the LFNST index is performed after the residual coding, the encoding apparatus may know whether there is the non-zero data (significant coefficients) for all positions within the TU or CU block through the residual coding. Accordingly, the encoding apparatus may determine whether to perform signaling on the LFNST index based on the existence of the non-zero data, and the decoding apparatus may determine whether the LFNST index is parsed. When the non-zero data does not exist in the area designated in 1) and 2) above, signaling of the LFNST index is performed.

Meanwhile, for the adopted LFNST, the following simplification methods may be applied.

(i) According to an example, the number of output data for the forward LFNST may be limited to a maximum of 16.

In the case of (c) of FIG. 11, the 4×4 LFNST may be applied to two 4×4 regions adjacent to the top-left, respectively, and in this case, a maximum of 32 LFNST output data may be generated. when the number of output data for forward LFNST is limited to a maximum of 16, in the case of 4×N/N×4 (N>16) blocks (TU or CU), the 4×4 LFNST is only applied to one 4×4 region in the top-left, the LFNST may be applied only once to all blocks of FIG. 11. Through this, the implementation of image coding may be simplified.

(ii) According to an example, zero-out may be additionally applied to a region to which the LFNST is not applied. In this document, the zero-out may mean filling values of all positions belonging to a specific region with a value of 0. That is, the zero-out can be applied to a region that is not changed due to the LFNST and maintains the result of the forward primary transformation. As described above, since the LFNST is divided into the 4×4 LFNST and the 8×8 LFNST, the zero-out can be divided into two types ((ii)-(A) and (ii)-(B)) as follows.

(ii)-(A) When the 4×4 LFNST is applied, a region to which the 4×4 LFNST is not applied may be zeroed out. FIG. 13 is a diagram illustrating the zero-out in a block to which the 4×4 LFNST is applied according to an example.

As shown in FIG. 13, with respect to a block to which the 4×4 LFNST is applied, that is, for all of the blocks in (a), (b) and (c) of FIG. 12, the whole region to which the LFNST is not applied may be filled with zeros.

On the other hand, (d) of FIG. 13 shows that when the maximum value of the number of the output data of the forward LFNST is limited to 16 according to one example, the zero-out is performed on the remaining blocks to which the 4×4 LFNST is not applied.

(ii)-(B) When the 8×8 LFNST is applied, a region to which the 8×8 LFNST is not applied may be zeroed out. FIG. 14 is a diagram illustrating the zero-out in a block to which the 8×8 LFNST is applied according to an example.

As shown in FIG. 14, with respect to a block to which the 8×8 LFNST is applied, that is, for all of the blocks in (d) and (e) of FIG. 12, the whole region to which the LFNST is not applied may be filled with zeros.

(iii) Due to the zero-out presented in (ii) above, the area filled with zeros may be not same when the LFNST is applied. Accordingly, it is possible to check whether the non-zero data exists according to the zero-out proposed in (ii) over a wider area than the case of the LFNST of FIG. 12.

For example, when (ii)-(B) is applied, after checking whether the non-zero data exists where the area filled with zero values in (d) and (e) of FIG. 12 in addition to the area filled with 0 additionally in FIG. 14, signaling for the LFNST index can be performed only when the non-zero data does not exist.

Of course, even if the zero-out proposed in (ii) is applied, it is possible to check whether the non-zero data exists in the same way as the existing LFNST index signaling. That is, after checking whether the non-zero data exists in the block filled with zeros in FIG. 12, the LFNST index signaling may be applied. In this case, the encoding apparatus only performs the zero out and the decoding apparatus does not assume the zero out, that is, checking only whether the non-zero data exists only in the area explicitly marked as 0 in FIG. 12, may perform the LFNST index parsing.

Various embodiments in which combinations of the simplification methods ((i), (ii)-(A), (ii)-(B), (iii)) for the LFNST are applied may be derived. Of course, the combinations of the above simplification methods are not limited to the following embodiment, and any combination may be applied to the LFNST.

EMBODIMENT

Limit the number of output data for forward LFNST to a maximum of 16→(i)

When the 4×4 LFNST is applied, all areas to which the 4×4 LFNST is not applied are zero-out→(ii)-(A)

When the 8×8 LFNST is applied, all areas to which the 8×8 LFNST is not applied are zero-out→(ii)-(B)

After checking whether the non-zero data exists also the existing area filled with zero value and the area filled with zeros due to additional zero outs ((ii)-(A), (ii)-(B)), the LFNST index is signaled only when the non-zero data does not exist→(iii)

In the case of Embodiment, when the LFNST is applied, an area in which the non-zero output data can exist is limited to the inside of the top-left 4×4 area. In more detail, in the case of FIG. 13(*a*) and FIG. 14(*a*), the 8th position in the scan order is the last position where non-zero data can exist. In the case of FIGS. 13(*b*) and (*c*) and FIG. 14(*b*), the 16th position in the scan order (ie, the position of the bottom-right edge of the top-left 4×4 block) is the last position where data other than 0 may exist.

Therefore, when the LFNST is applied, after checking whether the non-zero data exists in a position where the residual coding process is not allowed (at a position beyond the last position), it can be determined whether the LFNST index is signaled.

In the case of the zero-out method proposed in (ii), since the number of data finally generated when both the primary transform and the LFNST are applied, the amount of computation required to perform the entire transformation process can be reduced. That is, when the LFNST is applied, since zero-out is applied to the forward primary transform output data existing in a region to which the LFNST is not applied, there is no need to generate data for the region that become zero-out during performing the forward primary transform. Accordingly, it is possible to reduce the amount of computation required to generate the corresponding data. The additional effects of the zero-out method proposed in (ii) are summarized as follows.

First, as described above, the amount of computation required to perform the entire transform process is reduced.

In particular, when (ii)-(B) is applied, the amount of calculation for the worst case is reduced, so that the transform process can be lightened. In other words, in general, a large amount of computation is required to perform a large-size primary transformation. By applying (ii)-(B), the number of data derived as a result of performing the forward LFNST can be reduced to 16 or less. In addition, as the size of the entire block (TU or CU) increases, the effect of reducing the amount of transform operation is further increased.

Second, the amount of computation required for the entire transform process can be reduced, thereby reducing the power consumption required to perform the transform. Third, the latency involved in the transform process is reduced.

The secondary transformation such as the LFNST adds a computational amount to the existing primary transformation, thus increasing the overall delay time involved in performing the transformation. In particular, in the case of intra prediction, since reconstructed data of neighboring blocks is used in the prediction process, during encoding, an increase in latency due to a secondary transformation leads to an increase in latency until reconstruction. This can lead to an increase in overall latency of intra prediction encoding.

However, if the zero-out suggested in (ii) is applied, the delay time of performing the primary transform can be greatly reduced when LFNST is applied, the delay time for the entire transform is maintained or reduced, so that the encoding apparatus can be implemented more simply.

Meanwhile, in the conventional intra prediction, a coding target block is regarded as one coding unit, and coding is performed without partition thereof. However, the ISP (Intra Sub-Paritions) coding refers to performing the intra prediction coding with the coding target block being partitioned in a horizontal direction or a vertical direction. In this case, a reconstructed block may be generated by performing encoding/decoding in units of partitioned blocks, and the reconstructed block may be used as a reference block of the next partitioned block. According to an example, in the ISP coding, one coding block may be partitioned into two or four sub-blocks and be coded, and in the ISP, intra prediction is performed on one sub-block by referring to the reconstructed pixel value of a sub-block located adjacent to the left or top side thereof. Hereinafter, the term "coding" may be used as a concept including both coding performed by the encoding apparatus and decoding performed by the decoding apparatus.

The ISP partitions a block predicted as luma intra into two or four sub-partitionings in a vertical direction or a horizontal direction according to the size of the block. For example, the minimum block size to which the ISP can be applied is 4×8 or 8×4. If the block size is greater than 4×8 or 8×4, the block is partitioned into four sub-partitionings.

When the ISP is applied, the sub-blocks are sequentially coded according to the partition type, such as, horizontally or vertically, from left to right, or from top to bottom, and coding for the next sub-block may be performed after performing up to a restoration process through inverse transform and intra prediction for one sub-block. For the leftmost or uppermost sub-block, as in a conventional intra prediction method, the reconstructed pixel of the coding block which has been already coded is referred to. Additionally, if the previous sub-block is not adjacent to each side of an internal sub-block that follows it, in order to derive reference pixels adjacent to a corresponding side, as in the conventional intra prediction method, the reconstructed pixel of an already coded adjacent coding block is referred to.

In the ISP coding mode, all sub-blocks may be coded with the same intra prediction mode, and a flag indicating whether or not to use the ISP coding and a flag indicating in which direction (horizontal or vertical) partition is to be performed may be signaled. At this time, the number of sub-blocks may be adjusted to 2 or 4 depending on the block shape, and when the size (width×height) of one sub-block is less than 16, the partition may not be allowed for the corresponding sub-blocks, nor the application of the ISP coding itself may be restricted.

Meanwhile, in the case of ISP prediction mode, one coding unit is partitioned into two or four partition blocks, that is, sub-blocks, and predicted, and the same intra prediction mode is applied to the thus partitioned two or four partition blocks.

As described above, both a horizontal direction (if an M×N coding unit having a horizontal length and a vertical length of M and N, respectively, is divided in the horizontal direction, it is divided into M×(N/2) blocks when divided into two, and into an M×(N/4) blocks when divided into four) and a vertical direction (if the M×N coding unit is divided in the vertical direction, it is divided into (M/2)×N blocks when divided into two, and divided into (M/4)×N blocks when divided into four) are possible as the partition direction. When partitioned in the horizontal direction, partition blocks are coded in an order from top to down, and when partitioned in the vertical direction, partition blocks are coded in an order from left to right. The currently coded partition block may be predicted by referring to the reconstructed pixel values of the top (left) partition block in the case of the horizontal (vertical) direction partition.

Transformation may be applied to the residual signal generated by the ISP prediction method in units of partition blocks. MTS (Multiple Transform Selection) technology based on the DST-7/DCT-8 combination as well as the existing DCT-2 may be applied to the primary transform (core transform or primary transform) based on the forward direction, and an LFNST (Low Frequency Non-Separable Transform) may be applied to a transform coefficient generated according to the primary transform to generate a final modified transform coefficient.

That is, LFNST may also be applied to partition blocks divided by applying the ISP prediction mode, and the same intra prediction mode is applied to the divided partition blocks as described above. Accordingly, when selecting the LFNST set derived based on the intra prediction mode, the derived LFNST set may be applied to all partition blocks. That is, the same intra prediction mode is applied to all partition blocks, and thereby the same LFNST set may be applied to all partition blocks.

Meanwhile, according to an example, the LFNST may be applied only to transform blocks having both a horizontal and vertical length of 4 or more. Therefore, when the horizontal or vertical length of the partition block partitioned according to the ISP prediction method is less than 4, the LFNST is not applied and the LFNST index is not signaled. Additionally, when the LFNST is applied to each partition block, the corresponding partition block may be regarded as one transform block. Of course, when the ISP prediction method is not applied, the LFNST may be applied to the coding block.

Application of the LFNST to each partition block is described in detail as follows.

According to an example, after applying the forward LFNST to an individual partition block, and after leaving only up to 16 coefficients (8 or 16) in the top-left 4×4 region according to the transform coefficient scanning order, zero-out of filling all remaining positions and regions with a value of 0 may be applied.

Alternatively, according to an example, when the length of one side of the partition block is 4, the LFNST is applied only to the top-left 4×4 region, and when the length of all sides of the partition block, that is, the width and height, are 8 or more, the LFNST may be applied to the remaining 48 coefficients except for a bottom-right 4×4 region in a top-left 8×8 region.

Alternatively, according to an example, in order to adjust the computational complexity of the worst case to 8 multiplications per sample, when each partition block is 4×4 or 8×8, only 8 transform coefficients may be output after applying the forward LFNST. That is, if the partition block is 4×4, an 8×16 matrix may be applied as a transform matrix, and if the partition block is 8×8, an 8×48 matrix may be applied as a transform matrix.

Meanwhile, in the current VVC standard, LFNST index signaling is performed in units of coding units. Accordingly, when the ISP prediction mode is used and the LFNST is applied to all partition blocks, then the same LFNST index value may be applied to the corresponding partition blocks. That is, when the LFNST index value is transmitted once at the coding unit level, the corresponding LFNST index may be applied to all partition blocks in the coding unit. As described above, the LFNST index value may have values of 0, 1, and 2, 0 indicates a case in which the LFNST is not applied, and 1 and 2 indicate two transform matrices present in one LFNST set when the LFNST is applied.

As described above, the LFNST set is determined by the intra prediction mode, and since all partition blocks in the coding unit are predicted in the same intra prediction mode in the case of the ISP prediction mode, the partition blocks may refer to the same LFNST set.

As another example, the LFNST index signaling is still performed in units of coding units, but in the case of the ISP prediction mode, without determining whether or not to apply the LFNST uniformly to all partition blocks, whether to apply the LFNST index value signaled at the coding unit level to each partition block or not to apply the LFNST may be determined through a separate condition. Here, the separate condition may be signaled in the form of a flag for each partition block through the bitstream, and when the flag value is 1, the LENST index value signaled at the coding unit level may be applied, and when the flag value is 0, the LFNST may not be applied.

Hereinafter, a method for maintaining the computational complexity for the worst case when LFNST is applied to the ISP mode will be described.

In the case of ISP mode, in order to maintain the number of multiplications per sample (or per coefficient, or per position) at a certain value or less when LFNST is applied, the application of LFNST may be restricted. Depending on the size of the partition block, the number of multiplications per sample (or per coefficient, or per position) may be maintained at 8 or less by applying LFNST as follows.

1. When both the horizontal length and the vertical length of the partition block are equal to or greater than 4, the same method as the calculation complexity adjustment method for the worst case for LFNST in the current VVC standard may be applied.

That is, when the partition block is a 4×4 block, instead of a 16×16 matrix, in the forward direction, an 8×16 matrix obtained by sampling the top 8 rows from a 16×16 matrix may be applied, and in the backward direction, a 16×8 matrix obtained by sampling the left 8 columns from a 16×16 matrix may be applied. Additionally, when the partition block is an 8×8 block, in the forward direction, instead of a 16×48 matrix, an 8×48 matrix obtained by sampling the top 8 rows from a 16×48 matrix may be applied, and in the backward direction, instead of a 48×16 matrix, a 48×8 matrix obtained by sampling the left 8 columns from a 48×16 matrix may be applied.

In the case of a 4xN or N×4 (N>4) block, when forward transform is performed, 16 coefficients generated after applying a 16×16 matrix only to the top-left 4×4 block are arranged in the top-left 4×4 region, and the other regions may be filled with 0 values. Additionally, when performing inverse transform, 16 coefficients located in the top-left 4×4 block may be arranged in the scanning order to configure an input vector, and then 16 output data may be generated by multiplying the 16×16 matrix. The generated output data may be arranged in the top-left 4×4 region, and the remaining regions except for the top-left 4×4 region may be filled with zeros.

In the case of an 8×N or N×8 (N>8) block, when the forward-transformation is performed, 16 coefficients generated after applying the 16×48 matrix only to the ROI region in the top-left 8×8 block (remaining regions excluding the bottom-right 4×4 block from the top-left 8×8 block) may be arranged in the top-left 4×4 area, and the other regions may be filled with 0 values. Additionally, when performing inverse transform, 16 coefficients located in the top-left 4×4 block may be arranged in the scanning order to configure an input vector, and then 48 output data may be generated by multiplying the 48×16 matrix. The generated output data may be filled in the ROI region, and the other regions may be filled with 0 values.

As another example, in order to maintain the number of multiplications per sample (or per coefficient, or per position) at a certain value or less, the number of multiplications per sample (or per coefficient, or per position) based on the ISP coding unit size rather than the size of the ISP partition block may be maintained at 8 or less. If there is only one block among the ISP partition blocks, which satisfies the condition under which the LFNST is applied, the complexity calculation for the worst case of LFNST may be applied based on the corresponding coding unit size rather than the size of the partition block. For example, when a luma coding block for a certain coding unit is partitioned into 4 partition blocks of 4×4 size and coded by the ISP, and when no non-zero transform coefficient exists for two partition blocks among them, the other two partition blocks may be respectively set to generate 16 transform coefficients instead of 8 (based on the encoder).

Hereinafter, a method of signaling the LFNST index in the case of the ISP mode will be described.

As described above, the LFNST index may have values of 0, 1, and 2, where 0 indicates that the LFNST is not applied, and 1 and 2 respectively indicate either one of two LFNST kernel matrices included in the selected LFNST set. The LFNST is applied based on the LFNST kernel matrix selected by the LFNST index. A method of transmitting the LFNST index in the current VVC standard will be described as follows.

1. An LFNST index may be transmitted once for each coding unit (CU), and in the case of a dual-tree, individual LFNST indexes may be signaled for a luma block and a chroma block, respectively.

2. When the LFNST index is not signaled, the LFNST index value is inferred to be a default value of 0. The case where the LFNST index value is inferred to be 0 is as follows.

A. In the case of a mode in which no transform is applied (e.g., transform skip, BDPCM, lossless coding, etc.)

B. When the primary transform is not DCT-2 (DST7 or DCT8), that is, when the transform in the horizontal direction or the transform in the vertical direction is not DCT-2

C. When the horizontal length or vertical length for the luma block of the coding unit exceeds the size of the tansformable maximum luma transform, for example, when the size of the transformable maximum luma transform is 64, and when the size for the luma block of the coding block is equal to 128×16, the LFNST cannot be applied.

In the dual tree, whether each of a coding unit for a luma component and a coding unit for a chroma component exceeds a maximum luma transform size is determined. That is, whether the luma block exceeds the maximum luma transform size for transformation is checked, and whether the width/length of the corresponding luma block according to a color format with respect to the chroma block exceeds the maximum luma transform size for maximum transformation is checked. For example, when the color format is 4:2:0, the width/length of the corresponding luma block is twice that of the chroma block, and the transform size of the corresponding luma block is twice that of the chroma block. In another example, when the color format is 4:4:4, the width/length and transforma size of the corresponding luma block are the same as those of the chroma block.

A 64-length transform or a 32-length transform may mean a transform applied to width or height having a length of 64 or 32, respectively, and "transform size" may mean 64 or 32 as the corresponding length.

In the case of a single tree, after checking whether or not a horizontal length or a vertical length of a luma block exceeds the maximum transformable luma transform block size, if it exceeds, the LFNST index signaling may be omitted.

D. The LFNST index may be transmitted only when both the horizontal length and the vertical length of the coding unit are equal to or greater than 4.

In the case of a dual tree, the LFNST index may be signaled only when both the horizontal and vertical lengths for a corresponding component (i.e., a luma or chroma component) are equal to or greater than 4.

In the case of a single tree, the LFNST index may be signaled when both the horizontal and vertical lengths for the luma component are equal to or greater than 4.

E. If the position of the last non-zero coefficient is not a DC position (top-left position of the block), and if the position of the last non-zero coefficient is not a DC position, in the case of a luma block of a dual tree type, the LFNST index is transmitted. In the case of a dual tree type chroma block, if any one of the position of the last non-zero coefficient for Cb and the position of the last non-zero coefficient for Cr is not a DC position, the corresponding LNFST index is transmitted.

In the case of the single tree type, if the position of the last non-zero coefficient of any one of the luma component, Cb component, and Cr component is not the DC position, the LFNST index is transmitted.

Here, if a coded block flag (CBF) value indicating whether or not a transform coefficient for one transform block exists is 0, the position of the last non-zero coefficient for the corresponding transform block is not checked in order to determine whether or not the LFNST index is signaled. That is, when the corresponding CBF value is 0, since no transform is applied to the corresponding block, the position of the last non-zero coefficient may not be considered when checking the condition for the LFNST index signaling.

For example, 1) in the case of a dual tree type and a luma component, if the corresponding CBF value is 0, the LFNST index is not signaled, 2) in the case of a dual tree type and chroma component, if the CBF value for Cb is 0 and the CBF value for Cr is 1, only the position of the last non-zero coefficient for Cr is checked and the corresponding LFNST index is transmitted, 3) in the case of a single tree type, the position of the last non-zero coefficient is checked only for components having a CBF value of 1 for each of luma, Cb, and Cr.

F. When it is confirmed that the transform coefficient exists at a position other than a position where the LFNST transform coefficient may exist, the LFNST index signaling may be omitted. In the case of a 4×4 transform block and an 8×8 transform block, LFNST transform coefficients may exist at eight positions from the DC position according to the transform coefficient scanning order in the VVC standard, and the remaining positions are filled with zeros. Additionally, when the 4×4 transform block and the 8×8 transform block are not, LFNST transform coefficients may exist in sixteen positions from the DC position according to the transform coefficient scanning order in the VVC standard, and the remaining positions are filled with zeros.

Accordingly, if the non-zero transform coefficients exists in the region which should be filled with the zero value after progressing the residual coding, the LFNST index signaling may be omitted.

Meanwhile, the ISP mode may also be applied only to the luma block, or may be applied to both the luma block and the chroma block. As described above, when ISP prediction is applied, the corresponding coding unit may be divided into two or four partition blocks and predicted, and a transform may be applied to each of the partition blocks. Therefore, also when determining a condition for signaling the LFNST index in units of coding units, it is necessary to take into consideration the fact that the LFNST may be applied to respective partition blocks. In addition, when the ISP prediction mode is applied only to a specific component (e.g., a luma block), the LFNST index must be signaled in consideration of the fact that only the component is divided into partition blocks. The LFNST index signaling methods available in the ISP mode are summarized as follows.

1. An LFNST index may be transmitted once for each coding unit (CU), and in the case of a dual-tree, individual LFNST indexes may be signaled for a luma block and a chroma block, respectively.

2. When the LFNST index is not signaled, the LFNST index value is inferred to be a default value of 0. The case where the LFNST index value is inferred to be 0 is as follows.

A. In the case of a mode in which no transform is applied (e.g., transform skip, BDPCM, lossless coding, etc.)

B. When the horizontal length or vertical length for the luma block of the coding unit exceeds the size of the tansformable maximum luma transform, for example, when the size of the transformable maximum luma transform is 64, and when the size for the luma block of the coding block is equal to 128×16, the LFNST cannot be applied.

Whether or not to signal the LFNST index may be determined based on the size of the partition block instead of the coding unit. That is, if the horizontal or vertical length of the partition block for the corresponding luma block exceeds the size of the transformable maximum luma transformation, the LFNST index signaling may be omitted and the LFNST index value may be inferred to be 0.

In the case of a dual tree, it is determined whether a maximum transform block size is exceeded for each of a coding unit or a partition block for a luma component and a coding unit or a partition block for the chroma component. That is, if width and heigh lengths of the coding unit or partition block for luma are compared with a maximum luma transform size, respectively, and even if one is greater than the maximum luma transform size, LFNST is not applied, and in the case of the coding unit or partition block for chroma, the width/height length of the corresponding luma block for the color format and the size of the maximum luma transform capable of maximum transform are compared. For example, when the color format is 4:2:0, the width/height length of the corresponding luma block is twice that of the corresponding chroma block, respectively, and the transform size of the corresponding luma block is twice that of the corresponding chroma block. As another example, when the color format is 4:4:4, the width/height length and transform size of the corresponding luma block are the same as the corresponding chroma block.

In the case of a single tree, after checking whether or not a horizontal length or a vertical length for a luma block (coding unit or partition block) exceeds the maximum transformable luma transform block size, if it exceeds, the LFNST index signaling may be omitted.

C. If the LFNST included in the current VVC standard is applied, the LFNST index may be transmitted only when both the horizontal length and the vertical length of the partition block are equal to or greater than 4.

If the LFNST for the 2xM (1xM) or Mx2 (Mx1) block is applied in addition to the LFNST included in the current VVC standard, the LFNST index may be transmitted only when the size of the partition block is equal to or larger than a 2xM (1xM) or Mx2 (Mx1) block. Here, the expression "the P×Q block is equal to or greater than the R×S block" means that P>R and Q>S.

In summary, the LFNST index can be transmitted only when the partition block is equal to or greater than the minimum size to which the LFNST is applicable. In the case of a dual tree, the LFNST index can be signaled only when the partition block for the luma or chroma component is equal to or larger than the minimum size to which the LFNST is applicable. In the case of a single tree, the LFNST index can be signaled only when the partition block for the luma component is equal to or larger than the minimum size to which LFNST is applicable.

In this document, the expression "the M×N block is greater than or equal to the K×L block" means that M is greater than or equal to K and N is greater than or equal to L. The expression "the M×N block is larger than the K×L block" means that M is greater than or equal to K and N is greater than or equal to L, and that M is greater than K or N is greater than L. The expression "the M×N block less than or equal to the K×L block" means that M is less than or equal to K and N is less than or equal to L, while the expression "the M×N block is smaller than the K×L block" means that M is less than or equal to K and N is less than or equal to L, and that M is less than K or N is less than L.

D. If the position of the last non-zero coefficient is not a DC position (top-left position of the block), and if the position of the last non-zero coefficient is not a DC position in any one of all partition blocks In the case of a dual tree type luma block, the LFNST index is transmitted. In the case of a dual tree type and a chroma block, if at least one of the position of the last non-zero coefficient of all partition blocks for Cb (if the ISP mode is not applied to the chroma component, the number of partition blocks is considered to be one) and the position of the last non-zero coefficient of all partition blocks for Cr (if the ISP mode is not applied to the chroma component, the number of partition blocks is considered to be one) is not a DC position, the corresponding LNFST index may be transmitted.

In the case of the single tree type, if the position of the last non-zero coefficient of any one of all partition blocks for the luma component, the Cb component and the Cr component is not the DC position, the corresponding LFNST index may be transmitted.

Here, if the value of the coded block flag (CBF) indicating whether a transform coefficient exists for each partition block is 0, the position of the last non-zero coefficient for the corresponding partition block is not checked in order to determine whether or not the LFNST index is signaled. That is, when the corresponding CBF value is 0, since no transform is applied to the corresponding block, the position of the last non-zero coefficient for the corresponding partition block is not considered when checking the condition for the LFNST index signaling.

For example, 1) in the case of a dual tree type and a luma component, if the corresponding CBF value for each partition block is 0, the partition block is excluded when determining whether or not to signal the LFNST index, 2) in the case of a dual tree type and a chroma component, if the CBF value for Cb is 0 and the CBF value for Cris 1 for each partition block, only the position of the last non-zero coefficient for Cr is checked to determine whether or not to signal the LFNST index, 3) in the case of the single tree type, it is possible to determine whether or not to signal the LFNST index by checking the position of the last non-zero coefficient only for blocks having a CBF value of 1 for all partition blocks of the luma component, the Cb component, and the Cr component.

In the case of the ISP mode, image information may also be configured so that the position of the last non-zero coefficient is not checked, and an embodiment thereof is as follows.

i. In the case of the ISP mode, the LFNST index signaling may be allowed without checking the position of the last non-zero coefficient for both the luma block and the chroma block. That is, even if the position of the last non-zero coefficient for all partition blocks is the DC position or the corresponding CBF value is 0, the LFNST index signaling may be allowed.

ii. In the case of the ISP mode, the checking of the position of the last non-zero coefficient only for the luma block may be omitted, and in the case of the chroma block, the checking of the position of the last non-zero coefficient may be performed in the above-described manner. For example, in the case of a dual tree type and a luma block, the LFNST index signaling is allowed without checking the position of the last non-zero coefficient, and in the case of a dual tree type and a chroma block, whether or not a corresponding LFNST index is signaled may be determined by checking whether or not a DC position exists for the position of the last non-zero coefficient in the above-described manner.

iii. In the case of the ISP mode and the single tree type, the i or ii method may be applied. That is, in the case of the ISP mode and when the number i is applied to the single tree type, it is possible to omit the checking of the position of the last non-zero coefficient for both the luma block and the chroma block and allow LFNST index signaling. Alternatively, by applying section ii, for the partition blocks for the luma component, the checking of the position of the last non-zero coefficient is omitted, and for the partition blocks for the chroma component (if ISP is not applied for the chroma component, the number of partition blocks can be considered as 1), the position of the last non-zero coefficient is checked in the above-described manner, thereby determining whether or not to signal the LFNST index.

E. When it is confirmed that the transform coefficient exists at a position other than a position where the LFNST transform coefficient may exist even for one partition block among all partition blocks, the LFNST index signaling may be omitted.

For example, in the case of a 4×4 partition block and an 8×8 partition block, LFNST transform coefficients may exist at eight positions from the DC position according to the transform coefficient scanning order in the VVC standard, and the remaining positions are filled with zeros. Additionally, if it is equal to or greater than 4×4 and is not a 4×4 partition block nor an 8×8 partition block, LFNST transform coefficients may exist at 16 positions from the DC position according to the transform coefficient scanning order in the VVC standard, and all the remaining positions are filled with zeros.

Accordingly, if the non-zero transform coefficients exists in the region which should be filled with the zero value after progressing the residual coding, the LFNST index signaling may be omitted.

Meanwhile, in the case of the ISP mode, the length condition is independently viewed for the horizontal direction and the vertical direction, and DST-7 is applied instead of DCT-2 without signaling for the MTS index. It is determined whether or not the horizontal or vertical length is greater than or equal to 4 and less than or equal to 16, and a primary transform kernel is determined according to the determination result. Accordingly, in the case of the ISP mode, when the LFNST can be applied, the following transform combination configuration is possible.

1 . . . . When the LFNST index is 0 (including the case in which the LFNST index is inferred as 0), the primary transform decision condition at the time of the ISP included in the current VVC standard may be followed. In other words, it may be checked whether or not the length condition (being equal to or greater than 4 or equal to or less than 16) is independently satisfied for the horizontal and vertical directions, respectively, and if it is satisfied, DST-7 may be applied instead of DCT-2 for primary transform, while, if it is not satisfied, DCT-2 may be applied.

2. For a case in which the LFNST index is greater than 0, the following two configurations may be possible as a primary transform.

A. DCT-2 can be applied to both horizontal and vertical directions.

B. The primary transform decision condition at the time of the ISP included in the current VVC standard may be followed. In other words, it may be checked whether or not the length condition (being equal to or greater than 4 or equal to or less than 16) is independently satisfied for the horizontal and vertical directions, respectively, and if it is satisfied, DST-7 may be applied instead of DCT-2, while, if it is not satisfied, DCT-2 may be applied.

In the ISP mode, image information may be configured such that the LFNST index is transmitted for each partition block rather than for each coding unit. In this case, in the above-described LFNST index signaling method, it may be regarded that only one partition block exists in a unit in which the LFNST index is transmitted, and it may be determined whether or not to signal the LFNST index.

Meanwhile, in the following, a method of signaling an LFNST index before signaling a transform coefficient will be described.

In the current VVC specification text (JVET-Q2001-vE.docx), the LFNST index and the MTS index are signaled after all signaling for transform coefficients (This can be interpreted as parsing from the viewpoint of a decoding device, and in this document, "signaling" may be interpreted as parsing according to context. Also, parsing may be interpreted as signaling according to context.) as shown in Table 3. More precisely, the LFNST index is signaled and the MTS index is signaled only when the LFNST index value is 0. In this document, signaling of transform coefficients may mean, for example, signaling of information (or residual information) about (quantized) transform coefficients.

As shown in Table 3, when the transform tree is called, transform coefficients for all components constituting the currently coded coding unit are signaled. A residual coding syntax including information (or residual information) on (quantized) transform coefficients may be signaled through the transform tree.

The residual coding syntax may indicate a value of transform coefficients (e.g., coefficient level and/or sign) within a (quantized) block. In this case, for example, the transform coefficients may be sequentially indicated according to a scan order (e.g., (top-right) diagonal scan order).

TABLE 3

```
                                                                          Descriptor
coding_unit( x0, y0, cbWidth, cbHeight, cqtDepth, treeType, modeType ) {
  ......
  if( CuPredMode[ chType ][ x0 ][ y0 ] != MODE_INTRA
&& !pred_mode_plt_flag &&
      general_merge_flag[ x0 ][ y0 ] = = 0 )
    cu_coded_flag                                                         ae(v)
  if( cu_coded_flag ) {
    if( CuPredMode[ chType ][ x0 ][ y0 ] = = MODE_INTER &&
sps_sbt_enabled_flag &&
      !ciip_flag[ x0 ][ y0 ] && cbWidth <= MaxTbSizeY &&
cbHeight <= MaxTbSizeY ) {
      allowSbtVerH = cbWidth >= 8
      allowSbtVerQ = cbWidth >= 16
      allowSbtHorH = cbHeight >= 8
      allowSbtHorQ = cbHeight >= 16
      if( allowSbtVerH || allowSbtHorH )
        cu_sbt_flag                                                       ae(v)
      if( cu_sbt_flag ) {
        if( ( allowSbtVerH || allowSbtHorH ) && ( allowSbtVerQ
|| allowSbtHorQ ) )
          cu_sbt_quad_flag                                                ae(v)
        if( ( cu_sbt_quad_flag && allowSbtVerQ && allowSbtHorQ
) ||
            ( !cu_sbt_quad_flag && allowSbtVerH &&
allowSbtHorH ) )
          cu_sbt_horizontal_flag                                          ae(v)
        cu_sbt_pos_flag                                                   ae(v)
      }
    }
    if( sps_act_enabled_flag && CuPredMode[ chType ][ x0 ][ y0 ] !=
MODE_INTRA &&
        treeType = = SINGLE_TREE )
      cu_act_enabled_flag                                                 ae(v)
    LfnstDcOnly = 1
    LfnstZeroOutSigCoeffFlag = 1
    MtsDcOnly = 1
    MtsZeroOutSigCoeffFlag = 1
    transform_tree( x0, y0, cbWidth, cbHeight, treeType, chType )
    lfnstWidth = ( treeType = =
DUAL_TREE_CHROMA ) ? cbWidth / SubWidthC :
              ( ( IntraSubPartitionsSplitType = = ISP_VER_SPLIT ) ?
                cbWidth / NumIntraSubPartitions : cbWidth )
    lfnstHeight = ( treeType = =
DUAL_TREE_CHROMA ) ? cbHeight / SubHeightC :
              ( ( IntraSubPartitionsSplitType = = ISP_HOR_SPLIT) ?
                cbHeight / NumIntraSubPartitions : cbHeight )
    lfnstNotTsFlag = ( treeType = = DUAL_TREE_CHROMA ||
                  transform_skip_flag[ x0 ][ y0 ][ 0 ] = = 0 ) &&
                ( treeType = = DUAL_TREE_LUMA ||
                  ( transform_skip_flag[ x0 ][ y0 ][ 1 ] = = 0 &&
                    transform_skip_flag[ x0 ][ y0 ][ 2 ] = = 0 ) )
    if( Min( lfnstWidth, lfnstHeight ) >= 4 && sps_lfnst_enabled_flag
= = 1 &&
        CuPredMode[ chType ][ x0 ][ y0 ] = = MODE_INTRA &&
lfnstNotTsFlag = = 1 &&
        ( treeType = = DUAL_TREE_CHROMA ||
!intra_mip_flag[ x0 ][ y0 ] ||
          Min( lfnstWidth, lfnstHeight ) >= 16 ) &&
        Max( cbWidth, cbHeight ) <= MaxTbSizeY) {
      if( ( IntraSubPartitionsSplitType != ISP_NO_SPLIT ||
LfnstDcOnly = = 0 ) &&
          LfnstZeroOutSigCoeffFlag = = 1 )
        lfnst_idx                                                         ae(v)
    }
    if( treeType != DUAL_TREE_CHROMA && lfnst_idx = = 0
&&
        transform_skip_flag[ x0 ][ y0 ][ 0 ] = = 0 && Max( cbWidth,
cbHeight ) <= 32 &&
        IntraSubPartitionsSplitType = = ISP_NO_SPLIT &&
cu_sbt_flag = = 0 &&
```

TABLE 3-continued

```
                                                                Descriptor
        MtsZeroOutSigCoeffFlag = = 1 && MtsDcOnly = = 0 ) {
      if( ( ( CuPredMode[ chType ][ x0 ][ y0 ] = = MODE_INTER &&
          sps_explicit_mts_inter_enabled_flag ) ||
          ( CuPredMode[ chType ][ x0 ][ y0 ] = = MODE_INTRA &&
          sps_explicit_mts_intra_enabled_flag ) ) )
        mts_idx                                                 ae(v)
    }
  }
}
```

After parsing the LFNST index, the decoding apparatus may know which LFNST kernel, that is, the LFNST matrix is applied, and may perform inverse LFNST.

If the LFNST index can be parsed before parsing the transform coefficients, the inverse LFNST may be applied immediately after all necessary transform coefficients are parsed and inverse quantization is applied. In addition, when LFNST is applied, a region in which a transform coefficient cannot exist may be detected and the transform coefficient parsing may be omitted for the region, thereby improving coding efficiency.

In other words, if the LFNST index is parsed before the transform coefficient is parsed, the latency until the inverse LFNST application can be started can be reduced, and more efficient transform coefficient coding is possible.

According to an example, when signaling of the LFNST index is performed inside the transform tree invoked in Table 3, the coding unit syntax table of Table 3 may be modified as shown in Table 4.

TABLE 4

```
                                                                Descriptor
coding_unit( x0, y0, cbWidth, cbHeight, cqtDepth, treeType, modeType ) {
  ......
  if( CuPredMode[ chType ][ x0 ][ y0 ] != MODE_INTRA
&& !pred_mode_plt_flag &&
      general_merge_flag[ x0 ][ y0 ] = = 0 )
    cu_coded_flag                                               ae(v)
  if( cu_coded_flag ) {
    if( CuPredMode[ chType ][ x0 ][ y0 ] = = MODE_INTER &&
sps_sbt_enabled_flag &&
      !ciip_flag[ x0 ][ y0 ] && cbWidth <= MaxTbSizeY &&
cbHeight <= MaxTbSizeY ) {
      allowSbtVerH = cbWidth >= 8
      allowSbtVerQ = cbWidth >= 16
      allowSbtHorH = cbHeight >= 8
      allowSbtHorQ = cbHeight >= 16
      if( allowSbtVerH || allowSbtHorH )
        cu_sbt_flag                                             ae(v)
      if( cu_sbt_flag ) {
        if( ( allowSbtVerH || allowSbtHorH ) && ( allowSbtVerQ
|| allowSbtHorQ ) )
          cu_sbt_quad_flag                                      ae(v)
        if( ( cu_sbt_quad_flag && allowSbtVerQ &&
allowSbtHorQ ) ||
            ( !cu_sbt_quad_flag && allowSbtVerH &&
allowSbtHorH ) )
          cu_sbt_horizontal_flag                                ae(v)
        cu_sbt_pos_flag                                         ae(v)
      }
    }
    if( sps_act_enabled_flag && CuPredMode[ chType ][ x0 ][ y0 ] !=
MODE_INTRA &&
        treeType = = SINGLE_TREE )
      cu_act_enabled_flag                                       ae(v)
        LfnstIndexNotParsed = ( sps_lfnst_enabled_flag = = 1 &&
                CuPredMode[ chType ][ x0 ][ y0 ] = =
              MODE_INTRA &&
                ( treeType = = DUAL_TREE_CHROMA ||
                      !intra_mip_flag[ x0 ][ y0 ]
              ||
                      Min( cbWidth, cbHeight )
              >= 16 ) &&
                Max( cbWidth, cbHeight ) <= MaxTbSizeY )
        MtsIndexNotParsed = ( treeType != DUAL_TREE_CHROMA
                  &&
                  Max( cbWidth, cbHeight ) <= 32 &&
                  IntraSubPartitionsSplitType = =
                  ISP_NO_SPLIT &&
```

TABLE 4-continued

| | Descriptor |
|---|---|
| cu_sbt_flag = = 0 &&<br>( ( CuPredMode[ chType ][ x0 ][ y0 ] = =<br>MODE_INTER &&<br>sps_explicit_mts_inter_enabled_flag ) \|\|<br>( CuPredMode[ chType ][ x0 ][ y0 ] = =<br>MODE_INTRA &&<br>sps_explicit_mts_intra_enabled_flag ) ) )<br>transform_tree( x0, y0, cbWidth, cbHeight, treeType, chType ) | |

In Table 4, the LfnstIndexNotParsed variable and the MtsIndexNotParsed variable indicate whether to signal the LFNST index and the MTS index, respectively, in the transformation tree. If the value of the variable is 1, parsing of each index is performed, and if it is 0, it may not be performed.

The LfnstIndexNotParsed variable or the MtsIndexNotParsed variable being initialized to 1 in Table 4 indicates that signaling of the LFNST index or the MTS index can be performed inside the transform tree. The LfnstIndexNotParsed variable or the MtsIndexNotParsed variable is updated to 0 when signaling of the LFNST index or the MTS index is performed in the transformation tree or it is determined that the LFNST index or the MTS index does not need to be signaled.

For example, when LFNST or MTS is not applied from the beginning, the LfnstIndexNotParsed variable or the MtsIndexNotParsed variable is set to 0 before invoking the transform tree.

As shown in Table 4, the LfnstIndexNotParsed variable is initialized to 1 only when all of the following conditions are satisfied before invoking the transform tree (i.e., before signaling the transform coefficient), otherwise it is initialized to 0.

1. sps_lfnst_enabled_flag== when LFNST is applicable (enable)

2. CuPredMode [chType] [x0] [y0]==MODE_INTRA when the currently coded coding unit is coded in an intra prediction method Here, a chType of 0 indicates a luma separate tree (dual tree luma) or a single tree, and a chType of 1 indicates a chroma separate tree (dual tree chroma). x0 and y0 indicate the x and y coordinates on the picture for the luma component, and are coordinates when the x and y coordinates for the top-left position of the picture are 0, respectively. The x coordinate increases from left to right and y The coordinates increase from top to bottom. x0 and y0 are a position of a current coding unit in a corresponding picture, and in the case of a chroma separate tree, it refers to a position based on the luma component rather than the pixel for the actual chroma component. For example, when the horizontal (vertical) length of the chroma component picture is twice as small as that of the luma component picture, x0 (y0) becomes twice as large as the horizontal (vertical) position in the actual chroma component picture.

3. (treeType==DUAL_TREE_CHROMA!intra_mip_flag [x0] [y0] || Min (cbWidth, cbHeight)>=16)

When MIP (Matrix-based Intra Prediction) is not applied, or when MIP is applied and both the horizontal length and the vertical length of the coding unit are equal to or greater than 16 (MIP is not applied to the chroma component)

Here, cbWidth and cbHeight represent the horizontal and vertical lengths of the coding block based on the luma component. In the case of the chroma component, the horizontal (vertical) length of the luma component may be smaller by a certain ratio (e.g., 2) according to the color format (e.g., 4:2:0, 4:2:2, 4:4:4).

4. Max (cbWidth, cbHeight)<=MaxTbSize Y

When both the horizontal length and the vertical length of the currently coded coding unit are equal to or smaller than the maximum transform size for the luma component, based on the luma component For example, in the current VVC standard, 64 or 32 is possible as a value of MaxTbSize Y.

As shown in Table 4, the MtsIndexNotParsed variable is set to 1 only when all of the following conditions are satisfied, otherwise it is set to 0.

1. treeType!=DUAL_TREE_CHROMA when not a chroma seperate tree

2. Max (cbWidth, cbHeight)<=32

When both the horizontal and vertical lengths of the currently coded coding unit are equal to or smaller than 32

The meanings of cbWidth and cbHeight are the same as described above.

3. IntraSubPartitionsSplitType==ISP_NO_SPLIT

When ISP (Intra SubParitions) is not applied, that is, when the luma component is not divided into partition blocks 4. cu_sbt_flag==0.

When SBT (Subblock Transform) is not applied 5. ((CuPredMode [chType] [x0] [y0]==MODE_INTER && sps_explicit_mts_inter_enabled_flag)| | (CuPredMode [chType] [x0] [y0]==MODE_INTRA && sps_explicit_mts_intra_enabled_flag))

In the case where the coding unit is predicted in the inter prediction mode, when MTS can be explicitly applied when inter prediction is applied (enable) (when a value of the sps_explicit_mts_inter_enabled_flag is 1), or in the case where the coding unit is predicted in the intra prediction mode, when MTS can be explicitly applied when intra prediction is applied (when a value of sps_explicit_mts_intra_enabled_flag is 1)

The transform tree syntax table invoked in Table 4 is shown in Table 5, and the transform tree invokes the transform_unit syntax table as shown in Table 5, and invoking associated with the LFNST is as underlined (A), (B), (C) in Table 5.

In Table 5, (A) is a case in which ISP (Intra SubPartitions) is not applied, (B) is a case in which the ISP is applied and the partition blocks are divided in the horizontal direction, (C) represents a transform unit invoking for a case in which the ISP is applied and partition blocks are divided in the vertical direction. In Table 5, the NumIntraSubPartitions variable indicates the number of divided partition blocks when ISP is applied.

TABLE 5

```
                                                                   Descriptor
transform_tree( x0, y0, tbWidth, tbHeight , treeType, chType ) {
  InferTuCbfLuma = 1
  if( IntraSubPartitionsSplitType = = ISP_NO_SPLIT && !cu_sbt_flag )
{
    if( tbWidth > MaxTbSizeY || tbHeight > MaxTbSizeY ) {
      verSplitFirst = ( tbWidth > MaxTbSizeY && tbWidth > tbHeight )
? 1 : 0
      trafoWidth = verSplitFirst ? ( tbWidth / 2 ) : tbWidth
      trafoHeight = !verSplitFirst ? ( tbHeight / 2 ) : tbHeight
      transform_tree( x0, y0, trafoWidth, trafoHeight, treeType, chType )
      if( verSplitFirst )
  transform_tree( x0 + trafoWidth, y0, trafoWidth, trafoHeight, treeType, chT
ype )
      else
  transform_tree( x0, y0 + trafoHeight, trafoWidth, trafoHeight, treeType, ch
Type )
    } else {
      transform_unit( x0, y0, tbWidth, tbHeight, treeType, 0, chType )
·····(A)
    }
  } else if( cu_sbt_flag )
    if( !cu_sbt_horizontal_flag ) {
      trafoWidth = tbWidth * SbtNumFourthsTb0 / 4
      transform_unit( x0, y0, trafoWidth, tbHeight, treeType , 0, 0 )
  transform_unit( x0 + trafoWidth, y0, tbWidth − trafoWidth, tbHeight, treeT
ype, 1, 0 )
    } else {
      trafoHeight = tbHeight * SbtNumFourthsTb0 / 4
      transform_unit( x0, y0, tbWidth, trafoHeight, treeType , 0, 0 )
  transform_unit( x0, y0 + trafoHeight, tbWidth, tbHeight − trafoHeight, tree
Type, 1, 0 )
    }
   else if( IntraSubPartitionsSplitType = = ISP_HOR_SPLIT ) {
    trafoHeight = tbHeight / NumIntraSubPartitions
    for( partIdx = 0; partIdx < NumIntraSubPartitions; partIdx++ )
  transform_unit( x0, y0 + trafoHeight * partIdx, tbWidth, trafoHeight, treeTy
pe, partIdx, 0 ) ····· (B)
  } else if( IntraSubPartitionsSplitType = = ISP_VER_SPLIT ) {
    trafoWidth = tbWidth / NumIntraSubPartitions
    for( partIdx = 0; partIdx < NumIntraSubPartitions; partIdx++ )
  transform_unit( x0 + trafoWidth * partIdx, y0, trafoWidth, tbHeight, treeTy
pe, partIdx, 0 ) ······ (C)
  }
}
```

Table 6 shows a transform unit syntax table, and as shown in Table 6, a residual coding syntax table (residual_coding syntax table) is invoked from the transform unit syntax table.

As shown in Table 6, the residual coding syntax table may be invoked only when a value of a coded block flag (CBF) for each component is 1, where the CBF is 1 if a non-zero transform coefficient exists in a transform block for the corresponding component, otherwise is 0.

In Table 6, tu_y_coded_flag [x0] [y0] for the luma component, tu_cb_coded_flag [xC] [yC] for the Cb component, and tu_cr_coded_flag [xC] [yC] for the Cr component is the CBF for the corresponding component, respectively. Here, x0 and y0 represent x and y coordinate values in the luma picture for the corresponding luma transform block, and xC and yC represent x and y coordinate values in the chroma picture for the corresponding chroma transform block (Cb transform block or Cr transform block). Indicates the coordinate value. In this case, the x coordinate increases from left to right in the picture and the y coordinate increases from top to bottom in the picture.

Also, xC and yC are coordinates for the chroma transform block based on the luma component. For example, when a color format such as 4:2:2, 4:2:0, etc. is applied, if the horizontal (vertical) length of the luma picture is twice as great as the horizontal (vertical) length of the chroma picture, the x-coordinate (the y-coordinate) in the horizontal (vertical) direction based on the luma component becomes twice of the corresponding x-coordinate (the y-coordinate) on the chroma picture.

TABLE 6

```
                                                                   Descriptor
transform_unit( x0, y0, tbWidth, tbHeight, treeType, subTuIndex, chType ) {
  if( IntraSubPartitionsSplitType != ISP_NO_SPLIT &&
      treeType = = SINGLE_TREE && subTuIndex = =
NumIntraSubPartitions − 1 ) {
    xC = CbPosX[ chType ][ x0 ][ y0 ]
    yC = CbPosY[ chType ][ x0 ][ y0 ]
    wC = CbWidth[ chType ][ x0 ][ y0 ] / SubWidthC
    hC = CbHeight[ chType ][ x0 ][ y0 ] / SubHeightC
```

TABLE 6-continued

```
                                                                     Descriptor
  } else {
    xC = x0
    yC = y0
    wC = tbWidth / SubWidthC
    hC = tbHeight / SubHeightC
  }
  chromaAvailable = treeType != DUAL_TREE_LUMA &&
ChromaArrayType != 0 &&
    ( IntraSubPartitionsSplitType = = ISP_NO_SPLIT ||
    ( IntraSubPartitionsSplitType != ISP_NO_SPLIT &&
    subTuIndex = = NumIntraSubPartitions − 1 ) )
  if( ( treeType = = SINGLE_TREE || treeType = =
DUAL_TREE_CHROMA ) &&
      ChromaArrayType != 0 && ( IntraSubPartitionsSplitType = =
ISP_NO_SPLIT &&
      ( ( subTuIndex = = 0 && cu_sbt_pos_flag ) ||
      ( subTuIndex = = 1 && !cu_sbt_pos_flag) ) ) ) ||
      ( IntraSubPartitionsSplitType != ISP_NO_SPLIT &&
      ( subTuIndex = = NumIntraSubPartitions − 1 ) ) ) {
    tu_cb_coded_flag[ xC ][ yC ]                                     ae(v)
    tu_cr_coded_flag[ xC ][ yC ]                                     ae(v)
  }
  if( treeType = = SINGLE_TREE || treeType = =
DUAL_TREE_LUMA ) {
    if( ( IntraSubPartitionsSplitType = = ISP_NO_SPLIT &&
!( cu_sbt_flag &&
        ( ( subTuIndex = = 0 && cu_sbt_pos_flag ) ||
        ( subTuIndex = = 1 && !cu_sbt_pos_flag ) ) ) &&
        ( CuPredMode[ chType ][ x0 ][ y0 ] = = MODE_INTRA ||
        ( chromaAvailable && ( tu_cb_coded_flag[ xC ][ yC ] ||
        tu_cr_coded_flag[ xC ][ yC ] ) ) ||
        CbWidth[ chType ][ x0 ][ y0 ] > MaxTbSizeY ||
        CbHeight[ chType ][ x0 ][ y0 ] > MaxTbSizeY ) ) ||
        ( IntraSubPartitionsSplitType != ISP_NO_SPLIT &&
        ( subTuIndex < NumIntraSubPartitions − 1 || !InferTuCbfLuma ) )
)
      tu_y_coded_flag[ x0 ][ y0 ]                                    ae(v)
    if(IntraSubPartitionsSplitType != ISP_NO_SPLIT )
      InferTuCbfLuma = InferTuCbfLuma &&
!tu_y_coded_flag[ x0 ][ y0 ]
  }
  ......
  if( tu_y_coded_flag[ x0 ][ y0 ] &&
treeType != DUAL_TREE_CHROMA ) {
    if( sps_transform_skip_enabled_flag && !BdpcmFlag[ x0 ][ y0 ][ 0 ]
&&
        tbWidth <= MaxTsSize && tbHeight <= MaxTsSize &&
        ( IntraSubPartitionsSplitType = = ISP_NO_SPLIT ) &&
!cu_sbt_flag )
      transform_skip_flag[ x0 ][ y0 ][ 0 ]                           ae(v)
    if( !transform_skip_flag[ x0 ][ y0 ][ 0 ] ||
slice_ts_residual_coding_disabled_flag )
      residual_coding( x0, y0, Log2( tbWidth ), Log2( tbHeight ), 0 )
    else
      residual_ts_coding( x0, y0, Log2( tbWidth ), Log2( tbHeight ), 0 )
  }
  if( tu_cb_coded_flag[ xC ][ yC ] &&
treeType != DUAL_TREE_LUMA ) {
    if( sps_transform_skip_enabled_flag && !BdpcmFlag[ x0 ][ y0 ][ 1 ]
&&
        wC <= MaxTsSize && hC <= MaxTsSize &&
!cu_sbt_flag )
      transform_skip_flag[ xC ][ yC ][ 1 ]                           ae(v)
    if( !transform_skip_flag[ xC ][ yC ][ 1 ] ||
slice_ts_residual_coding_disabled_flag )
      residual_coding( xC, yC, Log2( wC ), Log2( hC ), 1 )
    else
      residual_ts_coding( xC, yC, Log2( wC ), Log2( hC ), 1 )
  }
  if( tu_cr_coded_flag[ xC ][ yC ] && treeType != DUAL_TREE_LUMA
&&
      !( tu_cb_coded_flag[ xC ][ yC ] &&
tu_joint_cbcr_residual_flag[ xC ][ yC ] ) ) {
    if( sps_transform_skip_enabled_flag && !BdpcmFlag[ x0 ][ y0 ][ 2 ]
&&
        wC <= MaxTsSize && hC <= MaxTsSize &&
!cu_sbt_flag )
```

TABLE 6-continued

| | Descriptor |
|---|---|
| transform_skip_flag[ xC ][ yC ][ 2 ] | ae(v) |
| if( !transform_skip_flag[ xC ][ yC ][ 2 ] \|\| slice_ts_residual_coding_disabled_flag ) | |
| residual_coding( xC, yC, Log2( wC ), Log2( hC ), 2 ) | |
| else | |
| residual_ts_coding( xC, yC, Log2( wC ), Log2( hC ), 2 ) | |
| } | |
| } | |

On the other hand, in Table 6, even if the value of the transform skip flag for each component (transform_skip_flag [x0] [y0] [0], transform_skip_flag [xC] [yC] [1], transform_skip_flag [xC] [yC] [2] for luma component, Cb component, Cr component, respectively) is 1, when the value of the slice_ts_residual_coding_disabled_flag is 1, residual coding may be invoked. The same as Table 4, since LFNST is not applied when at least one component having a transform skip flag value of 1 exists (LFNST index is not signaled and is inferred as 0), LfnstDcOnly and LfnstZeroOutSigCoeffFlag updated by residual coding do not affect LFNST index signaling. If at least one component having a transform skip flag value of 1 exists, since the lfnstNotTsFlag value in Table 4 becomes 0, the LFNST index is not signaled.

As shown in Table 6, residual coding may be invoked for each Y, Cb, Cr component. Accordingly, in the case of the single tree, residual coding for Y, Cb, Cr components may all be invoked in one transform unit.

From Tables 5 and 6, how the residual coding may be invoked for various cases is summarized as follows. Here, if the CBF value of a component is 0, residual coding is not invoked for the corresponding component, but for convenience of description, it is assumed that the CBF values of all components are non-zero. That is, it is assumed that residual coding is invoked.

1. Luma separate tree (dual tree luma)
1-1) When ISP is not applied: invokes residual coding for the luma component
1-2) When ISP is applied: invokes residual coding for each of ISP partition blocks configuring the Y component
2. Chroma separate tree (dual tree chroma): invokes residual coding for each of Cb component and Cr component
3. Single tree
3-1) When ISP is not applied: invokes residual coding for each of luma component, Cb component and Cr component
3-2) When ISP is applied: invokes residual coding for each of ISP partition blocks configuring the Y component, invokes residual coding for each of Cb component and Cr component Table 7 shows a residual coding syntax table, and an LFNST index and an MTS index may be signaled within the residual coding. Also, a LfnstIndexNotParsed variable and a MtsIndexNotParsed variable may be updated.

TABLE 7

| | Descriptor |
|---|---|
| residual_coding( x0, y0, log2TbWidth, log2TbHeight, cIdx ) { | |
| if( sps_mts_enabled_flag && cu_sbt_flag && cIdx = = 0 && log2TbWidth = = 5 && log2TbHeight < 6 ) | |
| log2ZoTbWidth = 4 | |
| else | |
| log2ZoTbWidth = Min( log2TbWidth, 5 ) | |
| if( sps_mts_enabled_flag && cu_sbt_flag && cIdx = = 0 && log2TbWidth < 6 && log2TbHeight = = 5 ) | |
| log2ZoTbHeight = 4 | |
| else | |
| log2ZoTbHeight = Min( log2TbHeight, 5 ) | |
| if( lfnstIndexNotParsed = = 0 && lfnst_idx > 0 && ( treeType != SINGLE_TREE \|\|cIdx = = 0 ) && transform_skip_flag[ x0 ][ y0 ][ cIdx ] = = 0 ) { | |
| log2ZoTbWidth = 2 | |
| log2ZoTbHeight = 2 | |
| } | |
| if( log2TbWidth > 0 ) | |
| last_sig_coeff_x_prefix | ae(v) |
| if( log2TbHeight > 0 ) | |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| if( lfnstIndexNotParsed == 1 && Min( log2TbWidth, log2TbHeight ) >= 2 && transform_skip_flag[ x0 ][ y0 ][ cIdx ] = = 0 && ( IntraSubPartitionsSplitType != ISP_NO_SPLIT \|\| LastSignificantCoeffX != 0 \|\| LastSignificantCoeffY != 0 ) && ( LastSignificantCoeffX < 4 && LastSignificantCoeffY < 4 ) && | |

TABLE 7-continued

<table>
<tr><th></th><th>Descriptor</th></tr>
<tr><td>( log2TbWidth >= 4 || log2TbWidth != log2TbHeight ||</td><td></td></tr>
<tr><td>( ( LastSignificantCoeffX + LastSignificantCoeffY ) < 3 ||</td><td></td></tr>
<tr><td>( ( LastSignificantCoeffX + LastSignificantCoeffY ) = = 3</td><td></td></tr>
<tr><td>&&</td><td></td></tr>
<tr><td>LastSignificantCoeffX < LastSignificantCoeffY ) ) ) )</td><td></td></tr>
<tr><td>lfnst_idx</td><td>ae(v)</td></tr>
<tr><td>LfnstIndexNotParsed = 0</td><td></td></tr>
<tr><td>if( MtsIndexNotParsed = = 1 && lfnst_idx = = 0 && cIdx</td><td></td></tr>
<tr><td>= = 0 &&</td><td></td></tr>
<tr><td>transform_skip_flag[ x0 ][ y0 ][ cIdx ] = = 0 &&</td><td></td></tr>
<tr><td>LastSignificantCoeffX <= 15 && LastSignificantCoeffY <=</td><td></td></tr>
<tr><td>15 &&</td><td></td></tr>
<tr><td>( LastSignificantCoeffX != 0 || LastSignificantCoeffY != 0 ) )</td><td></td></tr>
<tr><td>mts_idx</td><td>ae(v)</td></tr>
<tr><td>MtsIndexNotParsed = 0</td><td></td></tr>
<tr><td>if( mts_idx > 0 && cIdx = = 0 )</td><td></td></tr>
<tr><td>log2ZoTbWidth = Min( log2ZoTbWidth, 4 )</td><td></td></tr>
<tr><td>if( mts_idx > 0 && cIdx = = 0 )</td><td></td></tr>
<tr><td>log2ZoTbHeight = Min( log2ZoTbHeight, 4 )</td><td></td></tr>
<tr><td>log2TbWidth = log2ZoTbWidth</td><td></td></tr>
<tr><td>log2TbHeight = log2ZoTbHeight</td><td></td></tr>
<tr><td>remBinsPass1 = ( ( 1 << ( log2TbWidth + log2TbHeight ) ) * 7 ) >></td><td></td></tr>
<tr><td>2</td><td></td></tr>
<tr><td>log2SbW = ( Min( log2TbWidth, log2TbHeight ) < 2 ? 1 : 2 )</td><td></td></tr>
<tr><td>log2SbH = log2SbW</td><td></td></tr>
<tr><td>if( log2TbWidth + log2TbHeight > 3 )</td><td></td></tr>
<tr><td>if( log2TbWidth < 2 ) {</td><td></td></tr>
<tr><td>log2SbW = log2TbWidth</td><td></td></tr>
<tr><td>log2SbH = 4 − log2SbW</td><td></td></tr>
<tr><td>} else if( log2TbHeight < 2 ) {</td><td></td></tr>
<tr><td>log2SbH = log2TbHeight</td><td></td></tr>
<tr><td>log2SbW = 4 − log2SbH</td><td></td></tr>
<tr><td>}</td><td></td></tr>
<tr><td>numSbCoeff = 1 << ( log2SbW + log2SbH )</td><td></td></tr>
<tr><td>lastScanPos = numSbCoeff</td><td></td></tr>
<tr><td>lastSubBlock = (</td><td></td></tr>
<tr><td>1 << ( log2TbWidth + log2TbHeight − ( log2SbW + log2SbH ) ) ) − 1</td><td></td></tr>
<tr><td>do {</td><td></td></tr>
<tr><td>if( lastScanPos = = 0 ) {</td><td></td></tr>
<tr><td>lastScanPos = numSbCoeff</td><td></td></tr>
<tr><td>lastSubBlock− −</td><td></td></tr>
<tr><td>}</td><td></td></tr>
<tr><td>lastScanPos− −</td><td></td></tr>
<tr><td>xS =</td><td></td></tr>
<tr><td>DiagScanOrder[ log2TbWidth − log2SbW ][ log2TbHeight − log2SbH ]</td><td></td></tr>
<tr><td>[ lastSubBlock ][ 0 ]</td><td></td></tr>
<tr><td>yS =</td><td></td></tr>
<tr><td>DiagScanOrder[ log2TbWidth − log2SbW ][ log2TbHeight − log2SbH ]</td><td></td></tr>
<tr><td>[ lastSubBlock ][ 1 ]</td><td></td></tr>
<tr><td>xC = ( xS << log2SbW ) +</td><td></td></tr>
<tr><td>DiagScanOrder[ log2SbW ][ log2SbH ][ lastScanPos ][ 0 ]</td><td></td></tr>
<tr><td>yC = ( yS << log2SbH ) +</td><td></td></tr>
<tr><td>DiagScanOrder[ log2SbW ][ log2SbH ][ lastScanPos ][ 1 ]</td><td></td></tr>
<tr><td>} while( ( xC != LastSignificantCoeffX ) || ( yC !=</td><td></td></tr>
<tr><td>LastSignificantCoeffY ) )</td><td></td></tr>
<tr><td>QState = 0</td><td></td></tr>
<tr><td>for( i = lastSubBlock; i >= 0; i− − ) {</td><td></td></tr>
<tr><td>startQStateSb = QState</td><td></td></tr>
<tr><td>xS =</td><td></td></tr>
<tr><td>DiagScanOrder[ log2TbWidth − log2SbW ][ log2TbHeight − log2SbH ]</td><td></td></tr>
<tr><td>[ i ][ 0 ]</td><td></td></tr>
<tr><td>yS =</td><td></td></tr>
<tr><td>DiagScanOrder[ log2TbWidth − log2SbW ][ log2TbHeight − log2SbH ]</td><td></td></tr>
<tr><td>[ i ][ 1 ]</td><td></td></tr>
<tr><td>inferSbDcSigCoeffFlag = 0</td><td></td></tr>
<tr><td>if( i < lastSubBlock && i > 0 ) {</td><td></td></tr>
<tr><td>sb_coded_flag[ xS ][ yS ]</td><td>ae(v)</td></tr>
<tr><td>inferSbDcSigCoeffFlag = 1</td><td></td></tr>
<tr><td>}</td><td></td></tr>
<tr><td>......</td><td></td></tr>
<tr><td>}</td><td></td></tr>
<tr><td>}</td><td></td></tr>
</table>

As shown in Table 7, the LFNST index (lfnst_idx) is signaled immediately after the position of the last non-zero transform coefficient is signaled. More specifically, if last_sig_coeff_x_prefix, last_sig_coeff_y_prefix, last_sig_coeff_x_suffix, and last_sig_coeff_y_suffix in Table 7 are parsed, the position of the last non-zero transform coefficient can be known. The x coordinate and y coordinate of the position of the last non-zero transform coefficient are determined by LastSignificantCoeffX and LastSignificantCoeffY, respectively. Here, when the x coordinate and y coordinate of the top-left position (DC position) in the transform block parsing the current transform coefficient are respectively 0, the x coordinate and y coordinate mean the coordinates based on the DC position, that is the coordinates of the position of the last non-zero transform coefficient. The x coordinate increases from left to right and the y coordinate increases from top to bottom.

As shown in Table 7, the LFNST index (lfnst_idx) may be signaled only when all of the following conditions are satisfied.

1. lfnstIndexNotParsed==1 when a value of the lfnstIdxNotParsed variable is 1, that is, when the LFNST index needs to be signaled and has not yet been signaled 2. Min(log 2TbWidth, log 2TbHeight)>=2

When both the horizontal length and the vertical length of the currently coded transform block are equal to or greater than 4

3. transform_skip_flag [x0] [y0] [cIdx]==0

When the currently coded transform block is not coded in the transform skip mode cIdx is an index indicating a color component of a transform block. If 0, it indicates a luma component, if 1, it indicates a Cb component, and if 2, it indicates a Cr component. x0 and y0 indicate the coordinates within the picture for the component indicated by cIdx, and when the x and y coordinates of the top-left of the picture are set to 0, x0 and y0 coordinates are the x and y coordinates based on the top-left position, where the x coordinate increases from left to right and the y coordinate increases from top to bottom. As a result, x0 and y0 indicate positions within the picture for the corresponding component of the currently coded transform block.

4. (IntraSubPartitionsSplitType!=ISP_NO_SPLIT|| LastSignificantCoeffX!=0|| LastSignificantCoeffY!=0)

When it is not coded in the ISP mode, or when the position of the last non-zero transform coefficient is not the top-left position of the currently coded transform block The case in which the position of the last non-zero transform coefficient is not the top-left position of the currently coded transform block means that a non-zero transform coefficient exists in addition to the DC position (the top-left position in a certain transform block).

5. (LastSignificantCoeffX<4 && LastSignificantCoeffY<4)

When the position of the last non-zero transform coefficient exists within the top-left 4×4 region, that is, when it does not locate outside of the top-left 4×4 region 6. (log 2TbWidth>=4 log 2TbWidth!=log 2TbHeight ((LastSignificantCoeffX+LastSignificantCoeffY)<3|| ((LastSignificantCoeffX+LastSignificantCoeffY)==3 && LastSignificantCoeffX<LastSignificantCoeffY)))

When the size of the currently coded transform block is not 4×4 and 8×8, or

When the size of the currently coded transform block is 4×4 and 8×8, when the last non-zero transform coefficient exists in positions 1 to 8 as shown in FIGS. 9(*b*) (1 to 8 of FIG. 9(*b*) may mean a forward scan order of transform coefficients)

LastSignificantCoeffX and LastSignificantCoeffY mean the coordinates in the transform block of the last non-zero transform coefficient. When the x and y coordinates of the top-left position of the transform block are set to 0, they mean the x and y coordinates based on this, and the x coordinate increases from left to right and the y coordinate increases from top to bottom.

When the block of FIG. 9(*b*) is the top-left 4×4 block in the corresponding transform block, coordinates for positions 1, 2, 3, 4, 5, 6, 7, 8 of FIG. 9(*b*) (LastSignificantCoeffX, LastSignificantCoeffY) are (0, 0), (0, 1), (1, 0), (0, 2), (1, 1), (2, 0), (0, 3), (1, 2), respectively.

As shown in Table 7, immediately after signaling lfnst_idx (or after it is confirmed that signaling is not performed because the above-described conditions are not satisfied), the value of the lfnstIndexNotParsed variable is set to 0. After the value of the lfnstIndexNotParsed is set to 0, the LFNST index is not signaled when residual coding for other transform blocks included in the current coding unit is performed. That is, the LENST index may be signaled at most once per coding unit.

In which transform block among transform blocks included in the coding block, the LFNST index is signaled is as follows. For convenience of description, it may be assumed that a condition for signaling the LFNST index in the corresponding transform block is satisfied.

1. In case of luma separate tree 1-1) When ISP is applied: When divided into N (N is 2 or 4 in the case of VVC) partition blocks, signaling in a partition block having a CBF of 1 that appears first according to a coding order 1-2) When ISP is not applied: signaling in transform block for luma component 2. In case of chroma separate tree 2-1) When CBF for Cb component is 1: Signaling in transform block for Cb component 2-2) When the CBF for the Cb component is 0 and the CBF for the Cr component is 1: Signaling in the transform block for the Cr component 3. In case of single tree: Signaling in a first transform block with CBF of 1 when processed in the order of a transform block for a luma component, a transform block for a Cb component, and a transform block for a Cr component If there is no component having a CBF of 1 in the currently coded coding unit, the LFNST index is not signaled.

As described above, after the LFNST index is signaled (or after it is confirmed that the LFNST index is not signaled because the corresponding conditions are not met), the value of the lfnstIndexNotParsed is immediately set to 0, so the value of the lfnstIndexNotParsed is 0 for other transform block included in the coding unit, and the value of the lfnst_idx also maintains the value of the LFNST index parsed in the previous transform block. Therefore, as shown in Table 7, the value of the log2ZoTbWidth and the value of the log2ZoTbHeight may be set to 2 before coding the syntax elements for the position of the last non-zero transform coefficient, and Table 8 shows an excerpt of the relevant part.

TABLE 8

```
if( lfnstIndexNotParsed == 0 && lfnst_idx > 0 &&
    ( treeType != SINGLE_TREE || cIdx = = 0 ) &&
    transform_skip_flag[ x0 ][ y0 ][ cIdx ] = = 0 ) {
    log2ZoTbWidth = 2
    log2ZoTbHeight = 2
}
```

As shown in Table 8, if the LFNST index is already signaled in the previous transform block and the corresponding LFNST index value is greater than 0 (that is, if LFNST is applied), it satisfies the condition of FIG. 8 (IfnstIndexNotParsed==0 && Ifnst_idx>0).

In addition, in the current VVC standard specification, since LFNST is applied only to the luma component when it is 1) a luma separate tree, 2) a chroma separated tree, or 3) a single tree, (treeType!=SINGLE_TREE|| cIdx==0) condition of FIG. 8 is a condition for checking whether LFNST is a transform block to which LFNST can be applied.

Furthermore, since LFNST can be applied only to a transform block to which transform skip is not applied (transform_skip_flag [x0] [y0] [cIdx]==0) condition is checked. Here, x0 and y0 indicate x and y coordinates on the picture for the currently coded component, and the x coordinate increases from left to right and the y coordinate increases from top to bottom. cIdx is an index indicating a color component and has a value of 0 for the luma component, 1 for the Cb component, and 2 for the Cr component. That is, x0 and y0 indicate positions in the currently coded transform block in the corresponding picture.

In Table 8, when the if condition is satisfied, values of both the log 2ZoTb Width variable and the log 2ZoTbHeight variable are set to 2, and the log 2ZoTbWidth variable represents a logarithm value with a base of 2 for the horizontal length of the top-left region in which a non-zero transform coefficient can exist, and the log 2ZoTbHeight variable represents a logarithm value with a base of 2 for the vertical length of the top-left region in which non-zero transform coefficients can exist. Accordingly, when LFNST is applied, the maximum top-left region in which non-zero transform coefficients can be located becomes 4×4.

If the log 2ZoTbWidth variable value and log 2ZoTbHeight variable value are restricted as shown in Table 8, the possible ranges of the x coordinate value and the y coordinate value for the position of the last non-zero transform coefficient are restricted to 0 to 3, respectively.

Accordingly, as shown in Table 9, truncated unary binarization for last_sig_coeff_x_prefix and last_sig_coeff_y_prefix may also be adjusted by reflecting the changed log 2ZoTbWidth variable value and log 2ZoTbHeight variable value.

In Table 9, TR, cMax, and cRiceParam have their meanings defined in the VVC WD document (JVET-Q2001-vE.docx), and TR indicates that it is coded in the Truncated Rice Binarization method. cMax and cRiceParam are parameters referenced by TR.

In Table 9, since the cRiceParam value is 0, the values from 0 to cMax are binarized and coded into binary string such as 0, 10, 110, 1110, . . . , 111 . . .1110, 111 . . . 1111, and the number of 1s in the last binary string is cMax.

TABLE 9

| | | |
|---|---|---|
| last_sig_coeff_x_prefix | TR | cMax = ( log2ZoTbWidth << 1 ) − 1, cRiceParam = 0 |
| last_sig_coeff_y_prefix | TR | cMax = ( log2ZoTbHeight << 1 ) − 1, cRiceParam = 0 |

When the size of the transform block is 4×4 or 8×8 and LFNST is applied, up to 8 non-zero transform coefficients may exist in the top-left 4×4 region according to the scan order as shown in FIG. 9(*b*). Therefore, when the if condition in Table 8 is satisfied (becomes true) and it is determined that LFNST is applied to the corresponding transform block and the size of the corresponding transform block is 4×4 or 8×8, the position of the last non-zero transform coefficient should be restricted to positions 1 to 8 in FIG. 9(*b*).

However, by setting the log 2ZoTbWidth variable value and the log 2ZoTbHeight variable value to 2 as shown in Table 9, the position of the last non-zero transform coefficient cannot be restricted to positions 1 to 8 in FIG. 9(*b*). That is, the last non-zero transform coefficient may be located at an unnumbered position in FIG. 9(*b*). Therefore, a bitstream constraint on the last non-zero transform coefficient position must be followed. For example, such restrictions may be added to the syntax element as shown in Table 10.

TABLE 10

......
last_sig_coeff_x_prefix specifies the prefix of the column position of the last significant coefficient in scanning order within a transform block. The values of last_sig_coeff_x_prefix shall be in the range of 0 to ( log2ZoTbWidth << 1 ) − 1, inclusive.
When last_sig_coeff_x_prefix is not present, it is inferred to be 0.
last_sig_coeff_y_prefix specifies the prefix of the row position of the last significant coefficient in scanning order within a transform block. The values of last_sig_coeff_y_prefix shall be in the range of 0 to ( log2ZoTbHeight << 1 ) − 1, inclusive.
When last_sig_coeff_y_prefix is not present, it is inferred to be 0.
It is a requirement of bitstream conformance that, when all of the following conditions are true, the values of LastSignificantCoeffX and LastSignificantCoeffY shall be constrained such that the sum of LastSignificantCoeffX and LastSignificantCoeffY is less than 3, or the sum of LastSignificantCoeffX and LastSignificantCoeffY is equal to 3 with LastSignificantCoeffX less than LastSignificantCoeffY:

- lfnstIndexNotParsed is equal to 0.
- lfnst_idx is greater than 0.
- treeType is not equal to SINGLE_TREE or cIdx is equal to 0.
- transform_skip_flag[ x0 ][ y0 ][ cIdx ] is equal to 0.
- log2TbWidth is equal to log2TbHeight.
- log2TbWidth is equal to 2 or 3..

......

In addition, as shown in Table 7, last_sig_coeff_x_suffix and last_sig_coeff_y_suffix are signaled only when last_sig_coeff_x_prefix and last_sig_coeff_y_prefix are greater than 3, respectively, and in the case where LFNST is applied, since LastSignificantCoeffX and LastSignificantCoeffX cannot be greater than 3, respectively, and LastSignificantCoeffX and LastSignificantCoeffX are equal to last_sig_coeff_x_prefix and last_sig_coeff_y_prefix, respectively, Table 10 may be described as Table 11.

TABLE 11

| |
|---|
| ...... |
| last_sig_coeff_x_prefix specifies the prefix of the column position of the last significant coefficient in scanning order within a transform block. The values of last_sig_coeff_x_prefix shall be in the range of 0 to ( log2ZoTbWidth << 1 ) − 1, inclusive. |
| When last_sig_coeff_x_prefix is not present, it is inferred to be 0. |
| last_sig_coeff_y_prefix specifies the prefix of the row position of the last significant coefficient in scanning order within a transform block. The values of last_sig_coeff_y_prefix shall be in the range of 0 to ( log2ZoTbHeight << 1 ) − 1, inclusive. |
| When last_sig_coeff_y_prefix is not present, it is inferred to be 0. |
| It is a requirement of bitstream conformance that, when all of the following conditions are true, the values of last_sig_coeff_x_prefix and last_sig_coeff_y_prefix shall be constrained such that the sum of last_sig_coeff_x_prefix and last_sig_coeff_y_prefix is less than 3, or the sum of last_sig_coeff_x_prefix and last_sig_coeff_y_prefix is equal to 3 with last_sig_coeff_x_prefix less than last_sig_coeff_y_prefix: |
| - lfnstIndexNotParsed is equal to 0. |
| - lfnst_idx is greater than 0. |
| - treeType is not equal to SINGLE_TREE or cIdx is equal to 0. |
| - transform_skip_flag[ x0 ][ y0 ][ cIdx ] is equal to 0. |
| - log2TbWidth is equal to log2TbHeight. |
| - log2TbWidth is equal to 2 or 3.. |
| ...... |

As shown in Table 7, since the MTS index is signaled when the LFNST index value is 0, the MTS index may be signaled after the LFNST index signaling.

In addition, the MTS index may be signaled only when the value of the MtsIndexNotParsed variable is 1. As shown in Table 4, the MtsIndexNotParsed variable is initialized before invoking the transform tree in the coding unit (i.e., initialized before signaling transform coefficients), and when it is determined that the MTS index does not need to be signaled, it is initialized to 0 and when it is determined that the MTS index needs to be signaled, it is initialized to 1.

Therefore, in Table 7, the MtsIndexNotParsed variable having the value of 1 means that it is necessary to signal the MTS index. As shown in Table 7, after signaling the MTS index (mts_idx) (or after not signaling mts_idx because the if condition for signaling mts_idx is not satisfied), the MtsIndexNotParsed variable value is updated to 0 and the MTS index is no longer signaled. That is, the MTS index may be signaled only once for one coding unit. Table 12 shows a part signaling the MTS index from Table 7.

TABLE 12

```
if( MtsIndexNotParsed = = 1 && lfnst_idx = = 0 && cIdx = = 0 &&
  transform_skip_flag[ x0 ][ y0 ][ cIdx ] = = 0 &&
  LastSignificantCoeffX <= 15 && LastSignificantCoeffY <= 15 &&
  ( LastSignificantCoeffX != 0 || LastSignificantCoeffY != 0 ) )
  mts_idx
```

In Table 12, "cIdx==0" is a condition for checking whether a color component is a luma component, and "transform_skip_flag [x0] [y0] [cIdx]==0" is a condition for checking whether a current transform block is not coded with transform skip (If a value of transform_skip_flag [x0] [y0] [cIdx] is 0, it means that transform skip is not applied, where x0, y0, and cIdx have the same meanings as described above).

"LastSignificantCoeffX<=15 && LastSignificantCoeffY<=15" is a condition to check that the position of the last non-zero transform coefficient is located inside the top-left 16×16 block. If the condition is not satisfied, then since it is certain that DST-7 or DCT-8 is not applied, mts_idx may be inferred as a value of 0 without signaling the MTS index. That is, DCT-2 is applied to both the horizontal and vertical directions of the transform block.

In the current VVC, if the transform coefficient for the luma component exists only in the DC position (or if the CBF for the luma component is 0), the MTS index is inferred as 0 without signaling, "(LastSignificantCoeffX!=0| | LastSignificantCoeffY!=0)" is a condition to check whether the last non-zero transform coefficient is located outside the DC position. In other words, DST-7 or DCT-8 may be applied only when the last non-zero transform coefficient is located other than the DC position.

The MTS index may be signaled only when a currently coded coding unit includes a luma component, and may be signaled only when a luma separate tree or a single tree is used to perform residual coding on a luma component transform block. Of course, if the CBF for the luma component is 0, since the corresponding residual coding is not invoked, the MTS index is not signaled, and if the MTS index is not signaled, it is inferred to be 0.

Hereinafter, according to an example, a method of signaling the MTS index after signaling the transform coefficient while signaling the LFNST index before signaling the transform coefficient will be described.

Since the MTS index is signaled only when the LFNST index is 0, the MTS index only needs to be signaled after the LFNST index. Therefore, for example, the MTS index is signaled in the coding unit as in Table 3 of the current VVC specification text (JVET-Q2001-vE.docx), and only the LFNST index in the residual coding syntax table as shown in Table 7 may be signaled. That is, the MTS index may be signaled after all the signaling of the transform coefficients is finished.

Table 13 shows the configuration of a coding unit syntax table for a scheme of signaling only the LFNST index in the residual coding syntax table and signaling the MTS index after signaling the transform coefficient.

TABLE 13

| | Descriptor |
|---|---|
| coding_unit( x0, y0, cbWidth, cbHeight, cqtDepth, treeType, modeType ) { | |
| ...... | |
| if( cu_coded_flag ) { | |
| if( CuPredMode[ chType ][ x0 ][ y0 ] = = MODE_INTER && sps_sbt_enabled_flag && | |
| !ciip_flag[ x0 ][ y0 ] && cbWidth <= MaxTbSizeY && cbHeight <= MaxTbSizeY ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \|\| allowSbtHorH ) | |
| cu_sbt_flag | ae(v) |
| if( cu_sbt_flag ) { | |
| if( ( allowSbtVerH \|\| allowSbtHorH ) && ( allowSbtVerQ \|\| allowSbtHorQ ) ) | |
| cu_sbt_quad_flag | ae(v) |
| if( ( cu_sbt_quad_flag && allowSbtVerQ && allowSbtHorQ ) \|\| | |
| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| if( sps_act_enabled_flag && CuPredMode[ chType ][ x0 ][ y0 ] != MODE_INTRA && | |
| treeType = = SINGLE_TREE ) | |
| cu_act_enabled_flag | ae(v) |
| MtsDcOnly = 1 | |
| MtsZeroOutSigCoeffFlag = 1 | |
| LfnstIndexNotParsed = ( sps_lfnst_enabled_flag = = 1 && | |
| CuPredMode[ chType ][ x0 ][ y0 ] = = MODE_INTRA && | |
| ( treeType = = DUAL_TREE_CHROMA \|\| | |
| !intra_mip_flag[ x0 ][ y0 ] \|\| | |
| Min( cbWidth, cbHeight ) >= 16 ) && | |
| Max( cbWidth, cbHeight ) <= MaxTbSizeY ) | |
| transform_tree( x0, y0, cbWidth, cbHeight, treeType, chType ) | |
| if( treeType != DUAL_TREE_CHROMA && lfnst_idx = = 0 && | |
| transform_skip_flag[ x0 ][ y0 ][ 0 ] = = 0 && Max( cbWidth, cbHeight ) <= 32 && | |
| IntraSubPartitionsSplitType = = ISP_NO_SPLIT && cu_sbt_flag = = 0 && | |
| MtsZeroOutSigCoeffFlag = = 1 && MtsDcOnly = = 0 ) { | |
| if( ( ( CuPredMode[ chType ][ x0 ][ y0 ] = = MODE_INTER && | |
| sps_explicit_mts_inter_enabled_flag ) \|\| | |
| ( CuPredMode[ chType ][ x0 ][ y0 ] = = MODE_INTRA && | |
| sps_explicit_mts_intra_enabled_flag ) ) ) | |
| mts_idx | ae(v) |
| } | |
| } | |
| } | |

As shown in Table 4, the transform tree is also invoked in Table 13, and the transform tree invokes the transform unit and the transform unit invokes the residual coding. Accordingly, the transform tree invoked in Table 13 may be the same as Table 5, and the transform unit invoked in the transform tree may also be the same as Table 6.

Table 14 shows a residual coding syntax table for a scheme of signaling only the LFNST index in the residual coding syntax table and signaling the MTS index after signaling the transform coefficient.

TABLE 14

```
                                                                    Descriptor
residual_coding( x0, y0, log2TbWidth, log2TbHeight, cIdx ) {
  if( sps_mts_enabled_flag && cu_sbt_flag && cIdx = = 0 &&
      log2TbWidth = = 5 && log2TbHeight < 6 )
    log2ZoTbWidth = 4
  else
    log2ZoTbWidth = Min( log2TbWidth, 5 )
  if( sps_mts_enabled_flag && cu_sbt_flag && cIdx = = 0 &&
      log2TbWidth < 6 && log2TbHeight = = 5 )
    log2ZoTbHeight = 4
  else
    log2ZoTbHeight = Min( log2TbHeight, 5 )
     if( lfnstIndexNotParsed = = 0 && lfnst_idx > 0 &&
     ( treeType != SINGLE_TREE || cIdx = = 0 ) &&
     transform_skip_flag[ x0 ][ y0 ][ cIdx ] = = 0 ) {
       log2ZoTbWidth = 2
       log2ZoTbHeight = 2
     }
  if( log2TbWidth > 0 )
    last_sig_coeff_x_prefix                                         ae(v)
  if( log2TbHeight > 0 )
    last_sig_coeff_y_prefix                                         ae(v)
  if( last_sig_coeff_x_prefix > 3 )
    last_sig_coeff_x_suffix                                         ae(v)
  if( last_sig_coeff_y_prefix > 3 )
    last_sig_coeff_y_suffix                                         ae(v)
     if( lfnstIndexNotParsed == 1 &&
       Min( log2TbWidth, log2TbHeight ) >= 2 &&
       transform_skip_flag[ x0 ][ y0 ][ cIdx ] = = 0 &&
       ( IntraSubPartitionsSplitType != ISP_NO_SPLIT ||
         LastSignificantCoeffX != 0 || LastSignificantCoeffY !=
       0 ) &&
       ( LastSignificantCoeffX < 4 && LastSignificantCoeffY < 4 )
       &&
       ( log2TbWidth >= 4 || log2TbWidth != log2TbHeight ||
         ( ( LastSignificantCoeffX + LastSignificantCoeffY ) < 3 ||
           ( ( LastSignificantCoeffX + LastSignificantCoeffY ) = = 3
       &&
                LastSignificantCoeffX < LastSignificantCoeffY ) ) ) )
    lfnst_idx                                                       ae(v)
     LfnstIndexNotParsed = 0
  log2TbWidth = log2ZoTbWidth
  log2TbHeight = log2ZoTbHeight
  remBinsPass1 = ( ( 1 << ( log2TbWidth + log2TbHeight ) ) * 7 ) >>
2
  log2SbW = ( Min( log2TbWidth, log2TbHeight ) < 2 ? 1 : 2 )
  log2SbH = log2SbW
  if( log2TbWidth + log2TbHeight > 3 )
    if( log2TbWidth < 2 ) {
      log2SbW = log2TbWidth
      log2SbH = 4 − log2SbW
    } else if( log2TbHeight < 2 ) {
      log2SbH = log2TbHeight
      log2SbW = 4 − log2SbH
    }
  numSbCoeff = 1 << ( log2SbW + log2SbH )
  lastScanPos = numSbCoeff
  lastSubBlock = (
1 << ( log2TbWidth + log2TbHeight − ( log2SbW + log2SbH ) ) ) − 1
  do {
    if( lastScanPos = = 0 ) {
      lastScanPos = numSbCoeff
      lastSubBlock− −
    }
    lastScanPos− −
    xS =
DiagScanOrder[ log2TbWidth − log2SbW ][ log2TbHeight − log2SbH ]
            [ lastSubBlock ][ 0 ]
    yS =
DiagScanOrder[ log2TbWidth − log2SbW ][ log2TbHeight − log2SbH ]
            [ lastSubBlock ][ 1 ]
    xC = ( xS << log2SbW ) +
DiagScanOrder[ log2SbW ][ log2SbH ][ lastScanPos ][ 0 ]
    yC = ( yS << log2SbH ) +
DiagScanOrder[ log2SbW ][ log2SbH ][ lastScanPos ][ 1 ]
  } while( ( xC != LastSignificantCoeffX ) || ( yC !=
LastSignificantCoeffY ) )
  if( ( lastSubBlock > 0 || lastScanPos > 0 ) && cIdx = = 0 )
    MtsDcOnly = 0
```

TABLE 14-continued

| | Descriptor |
|---|---|
| QState = 0 | |
| for( i = lastSubBlock; i >= 0; i− − ) { | |
| startQStateSb = QState | |
| xS = DiagScanOrder[ log2TbWidth − log2SbW ][ log2TbHeight − log2SbH ] [ i ][ 0 ] | |
| yS = DiagScanOrder[ log2TbWidth − log2SbW ][ log2TbHeight − log2SbH ] [ i ][ 1 ] | |
| inferSbDcSigCoeffFlag = 0 | |
| if( i < lastSubBlock && i > 0 ) { | |
| sb_coded_flag[ xS ][ yS ] | ae(v) |
| inferSbDcSigCoeffFlag = 1 | |
| } | |
| if( sb_coded_flag[ xS ][ yS ] && ( xS > 3 \|\| yS > 3 ) && cIdx = = 0 ) | |
| MtsZeroOutSigCoeffFlag = 0 | |
| ...... | |
| } | |
| } | |

As shown in Table 14, the MtsDcOnly variable and the MtsZeroOutSigCoeffFlag variable for MTS index signaling are updated in the residual coding, and the two variables are used as conditions for signaling the MTS index (mts_idx) of Table 13.

The MtsDcOnly variable is updated to 0 when a non-zero transform coefficient for the luma component exists other than (outside) the DC position, and MtsZeroOutSigCoeffFlag is updated to 0 when a non-zero transform coefficient exists outside the top-left 16×16 region of the luma transform block.

As shown in Table 13, mts_idx is signaled only when the MtsDcOnly variable value is 0 and the MtsZeroOutSigCoeffFlag value is 1, and both variables are initialized to 1 before signaling the transform coefficients (i.e., before invoking the transform tree).

The MtsDcOnly variable is a variable introduced to apply DCT-2 to both the horizontal and vertical directions without signaling the MTS index when the CBF for the luma transform block is 0 or a transform coefficient is present in the DC position. Practically, if the CBF for the luma transform block is 0, the transform itself is not applied.

The MtsZeroOutSigCoeffFlag variable is a variable introduced to ensure that up to 16 transform coefficients in each direction (horizontal direction and vertical direction) can exist when applying DST-7 or DCT-8 instead of DCT-2 as a primary transform to the transform block. That is, when 32×32 forward DST-7 or 32×32 forward DCT-8 is applied in the current VVC standard, only 16 transform coefficients are left from DC and the transform coefficients of the remaining 16 positions are zeroed out. Accordingly, when DST-7 or DCT-8 is applied to the horizontal and vertical directions, non-zero transform coefficients may exist only in the top-left 16×16 region. A value of the MtsZeroOutSigCoeffFlag variable of 1 indicates that zero-out is performed and DST-7 or DCT-8 can be applied to the transform block. The following drawings are provided to describe specific examples of the present disclosure. Since specific terms for devices or specific terms for signals/messages/fields illustrated in the drawings are provided for illustration, technical features of the present disclosure are not limited to the specific terms used in the following drawings.

FIG. 15 is a flowchart illustrating an operation of a video decoding apparatus according to an embodiment of the present disclosure.

Each process disclosed in FIG. 15 is based on some of details described with reference to FIG. 5 to FIG. 14. Therefore, a description of specific details overlapping those described with reference to FIG. 3 and FIG. 5 to FIG. 14 will be omitted or will be schematically made.

The decoding apparatus 300 according to an embodiment may receive residual information from a bitstream (S1510).

Specifically, the decoding apparatus 300 may decode information on quantized transform coefficients for the current block from the bitstream and may derive quantized transform coefficients for a target block based on the information on the quantized transform coefficients for the current block. Information on the quantized transform coefficients for the target block may be included in a sequence parameter set (SPS) or a slice header and may include at least one of information on whether an RST is applied, information on a reduced factor, information on a minimum transform size for applying an RST, information on a maximum transform size for applying an RST, an inverse RST size, and information on a transform index indicating any one of transform kernel matrices included in a transform set.

The decoding apparatus may further receive information on an intra prediction mode for the current block and information on whether an ISP is applied to the current block. The decoding apparatus may receive and parse flag information indicating whether to apply ISP coding or an ISP mode, thereby deriving whether the current block is split into a predetermined number of sub-partition transform blocks. Here, the current block may be a coding block. Further, the decoding apparatus may derive the size and number of split sub-partition blocks through flag information indicating a direction in which the current block is split.

According to an example, an LFNST index may be received through the bitstream. The LFNST index is a value for specifying an LFNST matrix when an LFNST is applied as an inverse secondary non-separable transform and may have a value ranging from 0 to 2. For example, an LFNST index value of 0 may indicate that no LFNST is applied to the current block, an LFNST index value of 1 may indicate a first LFNST matrix, and an LFNST index value of 2 may indicate a second LFNST matrix.

The information on the ISP and the LFNST index may be received in a coding unit level.

The decoding apparatus 300 may derive a transform coefficient for the current block by performing inverse quantization based on residual information. For this, first, non-zero last transform coefficient position information based on residual information may be parsed (S1520).

This non-zero last transform coefficient position information may be last_sig_coeff_x_prefix, last_sig_coeff_y_prefix, last_sig_coeff_x_suffix, last_sig_coeff_y_suffix, and the x position of the last non-zero transform coefficient position may be derived through last_sig_coeff_coeff_x_coeff_suffix and the y position of the last non-zero transform coefficient position may be derived through last_sig_coeff_suffix and last_sig_coeff_y_suffix.

More specifically, last_sig_coeff_x_prefix represents a prefix of a column position of a last significant coefficient in a scanning order within a transform block, and last_sig_coeff_y_prefix represents a prefix of a row position of the last significant coefficient in the scanning order within the transform block, and last_sig_coeff_x_suffix represents a suffix of the column position of the last significant coefficient in the scanning order within the transform block, and last_sig_coeff_y_suffix represents a suffix of the row position of the last significant coefficient in the scanning order within the transform block. The scan order may be a right diagonal scan order.

Such non-zero last transform coefficient position information may be signaled in a residual coding level for syntax elements configuring a residual coding syntax table including information on transform coefficients.

According to an example, the decoding apparatus may parse the LFNST index related to the application of the LFNST after parsing the non-zero last transform coefficient position information (S1530).

The LFNST index may be signaled in a residual coding level in which non-zero last transform coefficient position information is signaled, and the decoding apparatus may derive transform coefficients after parsing the LFNST index (S1540). That is, information for deriving the transform coefficients may be parsed after parsing the LFNST index.

The derived transform coefficients may be arranged according to a inverse diagonal scan order in units of 4×4 blocks, and transform coefficients within the 4×4 block may also be arranged according to the inverse diagonal scan order. That is, transform coefficients on which inverse quantization has been performed may be arranged according to the inverse scan order applied in a video codec such as VVC or HEVC.

According to an example, the LFNST index may be signaled in the residual coding level rather than the coding unit level for syntax elements configuring the existing coding unit syntax table, and not after all transform coefficients are parsed, but after determining only the position information of the last significant coefficient, the LENST index may be parsed.

In this case, a buffering problem for the transform coefficient does not occur, and a time delay from parsing the transform coefficient until applying the LFNST does not occur. In addition, when a certain coding unit is coded in a single tree structure, a problem that a zero-out condition related to the position of the transform coefficient and a condition related to the DC position are checked for two chroma components even though LFNST is applied only to the luma component may be solved.

The current block may be a coding unit, and one coding unit may include a plurality of transform blocks according to a plurality of color components.

If the tree type of the current block is a single tree, the current block may include a transform block for a luma component, a transform block for a first chroma component, and a transform block for a second chroma component. In addition, if the tree type of the current block is dual tree luma, it may include a transform block for the luma component, and if the tree type of the current block is dual tree chroma, it may include a transform block for the first chroma component and the second chroma component.

Syntax elements configuring the residual coding syntax table may be signaled for each transform block included in the current block. Also, if the ISP mode is applied to the current block, syntax elements configuring the residual coding syntax table may be signaled for each divided partition block.

For example, if the tree type of the current block is dual tree luma or single tree and ISP is applied to the current block, syntax elements configuring the residual coding syntax table for each partition block for the luma component included in the current block may be signaled.

On the other hand, the LFNST index may be signaled only once per coding unit, and if the LFNST index is parsed in the residual coding level for a first transform block to which LFNST can be applied, it is not parsed in a subsequent transform block.

To this end, according to an example, an LFNST index parsing variable indicating whether the LFNST index is parsed at the coding unit level signaled before the residual coding level is initialized, and the LFNST index parsing variable may be updated at the residual coding level for a first transform block that satisfies the parsing condition of the LFNST index amomg transform blocks included in the current block. The updated LFNST index parsing variable may not be changed in a residual coding level for other transform block thereafter.

The LFNST index parsing variable may be the LfnstIndexNotParsed variable of Table 4, and the LfnstIndexNotParsed variable is initialized to 1 in the coding unit level and then if the LfnstIndexNotParsed variable is updated to 0 in Table 7 once, the LfnstIndexNotParsed variable is not changed in other transform block included in the same coding unit.

Meanwhile, as shown in Table 7, before the position of the last significant coefficient is derived in the residual coding unit, the size of the transform block is set to 16×16 or 32×32 by reflecting the zero-out according to the primary transform.

Thereafter, when the LFNST index parsing variable is updated due to the LFNST index parsing, the size of other subsequent transform block may be reset to a predetermined size in which zero-out is reflected. According to a second setting, the size of the transform block may be changed to 4×4 in which zero out by LFNST is reflected. That is, when the LENST index is parsed and the value is greater than 0, since LFNST can be applied to other transform blocks, the size of the transform block may be adjusted to a range in which a transform coefficient can exist when LFNST is applied (log 2ZoTbWidth=2, log 2ZoTbHeight=2 in Table 7).

On the other hand, when the size of the transform block is 4×4 or 8×8 and LFNST is applied, up to 8 non-zero transform coefficients may exist in the top-left 4×4 region according to a scan order as shown in FIG. 9(*b*). As shown in Table 7, even if the log 2ZoTbWidth variable value and the log 2ZoTbHeight variable value are set to 2, the positions of the last non-zero transform coefficients may not be limited to positions 1 to 8 in FIG. 9(*b*).

Accordingly, according to an example, when the size of the transform block is 4×4 or 8×8, the position of the last non-zero transform coefficient may be limited to a maximum of 8 in the top-left 4×4 region according to the scan order. This bitstream constraint may be added to the semantics of the positional information of the last non-zero transform coefficient.

The decoding apparatus may derive a modified transform coefficient by applying LFNST to the transform coefficients (S1550).

The decoding apparatus may determine an LFNST set including LFNST matrices based on the intra prediction mode derived from the information on the intra prediction mode, and may select any one of a plurality of LFNST matrices based on the LFNST set and the LFNST index.

Here, the same LFNST set and the same LFNST index may be applied to sub-partition transform blocks into which the current block is split. That is, since the same intra prediction mode is applied to the sub-partition transform blocks, the LFNST set determined based on the intra prediction mode may also be equally applied to all of the sub-partition transform blocks. In addition, since the LFNST index is signaled in the coding unit level, the same LFNST matrix may be applied to the sub-partition transform blocks into which the current block is split.

As described above, a transform set may be determined according to an intra prediction mode for a transform block to be transformed, and an inverse LFNST may be performed based on a transform kernel matrix, that is, any one of the LFNST matrices, included in the transform set indicated by the LFNST index. The matrix applied to the inverse LFNST may be called an inverse LFNST matrix or an LFNST matrix, and is referred to by any term as long as the matrix is the transpose of the matrix used for the forward LFNST.

In an example, the inverse LFNST matrix may be a non-square matrix in which the number of columns is less than the number of rows.

The decoding apparatus may derive modified transform coefficients from the transform coefficients based on the LFNST index and an LFNST matrix for the LFNST, that is, by applying the LFNST.

The LFNST is a non-separable transform in which a transform is applied to coefficients without separating the coefficients in a specific direction, unlike a primary transform of vertically or horizontally separating coefficients to be transformed and transforming the same. This non-separable transform may be a low-frequency non-separable transform of applying forward transform only to a low-frequency region rather than the entire area of a block.

The decoding apparatus may derive residual samples for the current block based on a primary inverse transform of the modified transform coefficient (S1560).

Here, as the primary inverse transform, a general separable transform may be used, or the foregoing MTS may be used.

According to an example, after the signaling of the LFNST index, the MTS index for the inverse primary transform of the transform block may be signaled, and the MTS index may be signaled in the residual coding syntax table for syntax elements configuring the residual coding syntax table in which the LFNST index is signaled or in the coding unit level for syntax elements configuring the coding unit syntax.

Subsequently, the decoding apparatus 300 may generate reconstructed samples based on the residual samples for the current block and prediction samples for the current block (S1570).

The following drawings are provided to describe specific examples of the present disclosure. Since specific terms for devices or specific terms for signals/messages/fields illustrated in the drawings are provided for illustration, technical features of the present disclosure are not limited to the specific terms used in the following drawings.

FIG. 16 is a flowchart illustrating an operation of a video encoding apparatus according to an embodiment of the present disclosure.

Each process disclosed in FIG. 16 is based on some of details described with reference to FIG. 4 to FIG. 14. Therefore, a description of specific details overlapping those described with reference to FIG. 2 and FIG. 4 to FIG. 14 will be omitted or will be schematically made.

The encoding apparatus 200 according to an embodiment may derive prediction samples for a current block based on an intra prediction mode applied to the current block (S1610).

When an ISP is applied to the current block, the encoding apparatus may perform prediction by each sub-partition transform block.

The encoding apparatus may determine whether to apply ISP coding or an ISP mode to the current block, that is, a coding block, and may determine a direction in which the current block is split and may derive the size and number of split subblocks according to a determination result.

The same intra prediction mode may be applied to sub-partition transform blocks into which the current block is split, and the encoding apparatus may derive a prediction sample for each sub-partition transform block. That is, the encoding apparatus sequentially performs intra prediction, for example, horizontally or vertically, or from left to right or from top to bottom, according to the split form of the sub-partition transform blocks. For the leftmost or uppermost subblock, a reconstructed pixel of a coding block already coded is referred to as in a conventional intra prediction method. Further, for each side of a subsequent internal sub-partition transform block, which is not adjacent to a previous sub-partition transform block, to derive reference pixels adjacent to the side, a reconstructed pixel of an adjacent coding block already coded is referred to as in the conventional intra prediction method.

The encoding apparatus 200 may derive residual samples for the current block based on the prediction samples (S1620).

The encoding apparatus 200 may derive transform coefficients for the current block by applying at least one of an LFNST or an MTS to the residual samples and may arrange the transform coefficients according to a predetermined scan order.

The encoding apparatus may derive the transform coefficients for the current block based on a transformation process, such as a primary transform and/or a secondary transform, on the residual samples, may apply the LFNST when the tree type of the current block is a single tree and the current block is a luma component, and may not apply the LFNST when the tree type of the current block is the single tree and the current block is a chroma component.

The encoding apparatus may derive the transform coefficients for the current block based on the primary transform of the residual samples (S1630).

The primary transform may be performed through a plurality of transform kernels as in the MTS, in which case a transform kernel may be selected based on the intra prediction mode.

The encoding apparatus 200 may derive modified transform coefficients by applying LFNST (S1640).

The LFNST is a non-separable transform in which a transform is applied to coefficients without separating the coefficients in a specific direction, unlike a primary transform of vertically or horizontally separating coefficients to be transformed and transforming the same. This non-separable transform may be a low-frequency non-separable transform of applying transform only to a low-frequency region rather than the entire target block to be transformed.

The encoding apparatus may determine an LFNST set including LFNST matrices based on the intra prediction mode derived from the information on the intra prediction mode, and may select any one of a plurality of LFNST matrices.

Here, the same LFNST set and the same LFNST index may be applied to sub-partition transform blocks into which the current block is split. That is, since the same intra prediction mode is applied to the sub-partition transform blocks, the LFNST set determined based on the intra prediction mode may also be equally applied to all of the sub-partition transform blocks. In addition, since the LFNST index is signaled in the coding unit level, the same LFNST matrix may be applied to the sub-partition transform blocks into which the current block is split.

As described above, a transform set may be determined according to an intra prediction mode for a transform block to be transformed, and an LFNST may be performed based on a transform kernel matrix, that is, any one of LFNST matrices, included in an LFNST transform set. The matrix applied to the LFNST may be called an LFNST matrix or, and is referred to by any term as long as the matrix is the transpose of the matrix used for an inverse LFNST.

In an example, the LFNST matrix may be a non-square matrix in which the number of rows is less than the number of columns.

The encoding apparatus may derive residual information by performing quantization based on the modified transform coefficients for the current block and may encode and output the residual information and the LFNST index.

The encoding apparatus may generate residual information including the information on the quantized transform coefficients. The residual information may include the foregoing transform-related information/syntax element. The encoding apparatus may encode image/video information including the residual information and may output the image/video information in the form of a bitstream.

More specifically, the encoding device 200 may encode the non-zero last transform coefficient position information (S1650), may encode the LFNST index to be signaled after the signaling of the non-zero last transform coefficient position (S1660), and after parsing the LFNST index, image information may be configured to derive modified transform coefficients (S1670).

This non-zero last transform coefficient position information may be last_sig_coeff_x_prefix, last_sig_coeff_y_prefix, last_sig_coeff_x_suffix, last_sig_coeff_y_suffix, and the x position of the last non-zero transform coefficient position may be derived through last_sig_coeff_coeff_x_coeff_suffix and the y position of the last non-zero transform coefficient position may be derived through last_sig_coeff_suffix and last_sig_coeff_y_suffix.

Such non-zero last transform coefficient position information may be signaled in a residual coding level including information on transform coefficients.

The LFNST index may be encoded in a residual coding level in which non-zero last transform coefficient position information is encoded, and information for transform coefficient derivation may be encoded after LFNST index encoding.

According to an example, the LFNST index may be signaled in the residual coding level rather than the existing coding unit level, and not after all the transform coefficients are parsed by the decoding apparatus, but after the position information of the last significant coefficient is identified, image information may be configured so that the LFNST index is parsed.

In this case, a buffering problem for the transform coefficient does not occur, and a time delay from parsing the transform coefficient until applying the LFNST does not occur. In addition, when a certain coding unit is coded in a single tree structure, a problem that a zero-out condition related to the position of the transform coefficient and a condition related to the DC position are checked for two chroma components even though LFNST is applied only to the luma component may be solved.

The current block may be a coding unit, and one coding unit may include a plurality of transform blocks according to a plurality of color components.

If the tree type of the current block is a single tree, the current block may include a transform block for a luma component, a transform block for a first chroma component, and a transform block for a second chroma component. In addition, if the tree type of the current block is dual tree luma, it may include a transform block for the luma component, and if the tree type of the current block is dual tree chroma, it may include a transform block for the first chroma component and the second chroma component.

Syntax elements configuring the residual coding syntax table may be signaled for each transform block included in the current block. Also, if the ISP mode is applied to the current block, syntax elements configuring the residual coding syntax table may be signaled for each divided partition block.

For example, if the tree type of the current block is dual tree luma or single tree and ISP is applied to the current block, syntax elements configuring the residual coding syntax table for each partition block for the luma component included in the current block may be encoded.

On the other hand, the LFNST index may be signaled only once per coding unit, and if the LFNST index is encoded in the residual coding level for a first transform block to which LFNST can be applied, it is not encoded in a subsequent transform block.

To this end, according to an example, an LFNST index parsing variable indicating whether the LFNST index is parsed at the coding unit level signaled before the residual coding level is initialized, and image information may be configured so that the LFNST index parsing variable can be updated at the residual coding level for a first transform block that satisfies the parsing condition of the LFNST index amomg transform blocks included in the current block. The updated LFNST index parsing variable may not be changed in a residual coding level for other transform block thereafter.

The LFNST index parsing variable may be the LfnstIndexNotParsed variable of Table 4, and the LfnstIndexNotParsed variable is initialized to 1 in the coding unit level and then if the LfnstIndexNotParsed variable is updated to 0 in Table 7 once, the LfnstIndexNotParsed variable is not changed in other transform block included in the same coding unit.

Meanwhile, the encoding apparatus may perform zero-out according to the primary transform, and through this, the size of the transform block may be set to 16×16 or 32×32.

If LFNST is applied, the size of the transform block may be changed to 4×4 in which zero out by LFNST is reflected. That is, when LFNST is applied, the size of the transform block may be adjusted to a range in which transform coefficients may exist.

On the other hand, when the size of the transform block is 4×4 or 8×8 and LFNST is applied, up to 8 non-zero transform coefficients may exist in the top-left 4×4 region according to a scan order as shown in FIG. 9(*b*). As shown in Table 7, even if the log 2ZoTbWidth variable value and the log 2ZoTbHeight variable value are set to 2, the positions of the last non-zero transform coefficients may not be limited to positions 1 to 8 in FIG. 9(*b*).

Accordingly, according to an example, when the size of the transform block is 4×4 or 8×8, the position of the last non-zero transform coefficient may be limited to a maximum of 8 in the top-left 4×4 region according to the scan order. This bitstream constraint may be added to the semantics of the positional information of the last non-zero transform coefficient That is, when the LFNST index parsing variable is updated, the encoding apparatus may configure image information so that a size of other transform block included in the coding unit is reset to a predetermined size in which zero-out is reflected, and when the size of the other transform block is 4×4 or 8×8, the encoding apparatus may encode image information to which bitstream constraint is applied so that up to 8 transform coefficients may exist in the top-left 4×4 region according to a scan order.

The encoding apparatus 200 may generate the information on the quantized transform coefficients and may encode the quantized information on the generated transform coefficients.

A syntax element of the LFNST index according to the present embodiment may indicate any one of whether the (inverse) LFNST is applied and any one of LFNST matrices included in the LFNST set, and when the LFNST set includes two transform kernel matrices, the syntax element of the LFNST index may have three values.

According to an example, when the split tree structure of the current block is a dual-tree type, the LFNST index may be encoded for each of a luma block and a chroma block.

According to an embodiment, the values of the syntax element of the transform index may include 0 indicating that no (inverse) LFNST is applied to the current block, 1 indicating a first LFNST matrix among the LFNST matrices, and 2 indicating a second LFNST matrix among the LFNST matrices.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

Further, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

What is claimed:

1. A decoding apparatus for decoding an image, the apparatus comprising:
a memory configured to store the image; and
a processor coupled with the memory,
wherein the processor is configured to:
obtain residual information from a bitstream;
derive transform coefficients for a current block by performing inverse quantization based on the residual information; and
derive modified transform coefficients by applying low-frequency non-separable transform (LFNST) to the transform coefficients,
wherein the processor is further configured to parse information on a position of a last non-zero transform coefficient,
wherein an LFNST index related to application of the LFNST is parsed after the parsing of the information on the position of the last non-zero transform coefficient,
wherein the transform coefficients are derived after the parsing of the LFNST index,
wherein an LFNST index parsing variable indicates whether the LFNST index is parsed, and is initialized in a coding unit level for syntax elements configuring a coding unit syntax table signaled ahead of a residual coding level,
wherein the LFNST index parsing variable is updated in the residual coding level for a first transform block that satisfies a parsing condition of the LFNST index among transform blocks included in the current block, and
wherein the updated LFNST index parsing variable is not changed in the residual coding level for other transform block thereafter.

2. The apparatus of claim 1,
wherein the information on the position of the last non-zero transform coefficient and the LFNST index are parsed in a residual coding level for syntax elements configuring a residual coding syntax table, and
wherein the syntax elements configuring the residual coding syntax table are signaled for each transform block included in the current block.

3. The apparatus of claim 2,
wherein, in response to a case where a tree type of the current block is a dual tree luma or a single tree and intra sub-partitions (ISP) is applied to the current block, the syntax elements configuring the residual coding syntax table are signaled for each partition block for a luma component included in the current block.

4. The apparatus of claim 1,
wherein, in response to a case where the LFNST index parsing variable is updated, a size of the other transform block is reset to a predetermined size reflecting zero-out.

5. The apparatus of claim 4,
wherein, in response to a case where the size of the other transform block is 4×4 or 8×8, a maximum of 8 transform coefficients according to a scan order is allowed to exist in a top-left 4×4 region.

6. The apparatus of claim 1,
wherein, after parsing the LFNST index, a multiple transform selection (MTS) index for an inverse primary transform of the transform block is parsed, and
wherein the MTS index is signaled in the residual coding level or the coding unit level in which the LFNST index is signaled.

7. An encoding apparatus for encoding an image, the apparatus comprising:
a memory configured to store the image; and
a processor coupled with the memory,
wherein the processor is configured to:
derive residual samples for a current block based on a prediction sample for the current block;
derive transform coefficients for the current block based on primary transform for the residual samples;
derive modified transform coefficients from the transform coefficients by applying low-frequency non-separable transform (LFNST); and
encode and output image information including residual information on the modified transform coefficients and an LFNST index related to application of the LFNST,
wherein the residual information includes information on a position of a last non-zero transform coefficient,
wherein the LFNST index is encoded to be signaled after signaling the information on the position of the last non-zero transform coefficient,
wherein the image information is configured so that the modified transform coefficients are derived after parsing the LFNST index,
wherein the image information is configured so that an LFNST index parsing variable indicates whether the LFNST index is signaled, and is initialized in a coding unit level for syntax elements configuring a coding unit syntax table signaled ahead of a residual coding level,
wherein the LFNST index parsing variable is updated in the residual coding level for a first transform block that satisfies a signaling condition of the LFNST index among transform blocks included in the current block, and
wherein the updated LFNST index parsing variable is not changed in the residual coding level for other transform block thereafter.

8. The apparatus of claim 7,
wherein the information on the position of the last non-zero transform coefficient and the LFNST index are encoded in a residual coding level for syntax elements configuring a residual coding syntax table, and
wherein the syntax elements configuring the residual coding syntax table are signaled for each transform block included in the current block.

9. The apparatus of claim 8,
wherein, in response to a case where a tree type of the current block is a dual tree luma or a single tree and intra sub-partitions (ISP) is applied to the current block, the syntax elements configuring the residual coding syntax table are signaled for each partition block for a luma component included in the current block.

10. The apparatus of claim 7, wherein, in response to a case where the LFNST index parsing variable is updated, a size of the other transform block is reset to a predetermined size reflecting zero-out.

11. The apparatus of claim 10, wherein, in response to a case where the size of the other transform block is 4×4 or 8×8, a maximum of 8 transform coefficients according to a scan order is allowed to exist in a top-left 4×4 region.

12. The apparatus of claim 7, wherein, after signaling the LFNST index, an MTS index for an inverse primary transform of the transform block is signaled, and wherein the MTS index is signaled in the residual coding level or the coding unit level in which the LFNST index is signaled.

13. An apparatus for transmitting data for image information, the apparatus comprising:

a processor configured to obtain a bitstream of the image information; and a transmitter configured to transmit the data comprising the bitstream of the image information, wherein the processor is configured to:

derive residual samples for a current block based on a prediction sample for the current block;

derive transform coefficients for the current block based on primary transform for the residual samples;

derive modified transform coefficients from the transform coefficients by applying low-frequency non-separable transform (LFNST); and encode and output the image information including residual information on the modified transform coefficients and an LFNST index related to application of the LFNST, wherein the residual information includes information on a position of a last non-zero transform coefficient, wherein the LFNST index is encoded to be signaled after signaling the information on the position of the last non-zero transform coefficient, wherein the image information is configured so that the modified transform coefficients are derived after parsing the LFNST index, wherein the image information is configured so that an LFNST index parsing variable indicates whether the LFNST index is signaled, and is initialized in a coding unit level for syntax elements configuring a coding unit syntax table signaled ahead of a residual coding level, wherein the LFNST index parsing variable is updated in the residual coding level for a first transform block that satisfies a signaling condition of the LFNST index among transform blocks included in the current block, and wherein the updated LFNST index parsing variable is not changed in the residual coding level for other transform block thereafter.

* * * * *